United States Patent
Lee et al.

(10) Patent No.: US 10,454,745 B2
(45) Date of Patent: Oct. 22, 2019

(54) METHOD AND DEVICE FOR CANCELLING INTER-SYMBOL INTERFERENCE IN WIRELESS COMMUNICATION SYSTEM

(71) Applicant: Samsung Electronics Co., Ltd, Suwon-si (KR)

(72) Inventors: Hyunyong Lee, Seoul (KR); Jung Ju Kim, Incheon (KR); Joon-Young Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/741,744

(22) PCT Filed: Jul. 1, 2016

(86) PCT No.: PCT/KR2016/007129
§ 371 (c)(1),
(2) Date: Jan. 3, 2018

(87) PCT Pub. No.: WO2017/007189
PCT Pub. Date: Jan. 12, 2017

(65) Prior Publication Data
US 2018/0219717 A1    Aug. 2, 2018

(30) Foreign Application Priority Data
Jul. 3, 2015    (KR) .................. 10-2015-0095468

(51) Int. Cl.
*H04L 27/26* (2006.01)
*H04B 7/06* (2006.01)
(Continued)

(52) U.S. Cl.
CPC ......... *H04L 27/2691* (2013.01); *H04B 7/063* (2013.01); *H04B 7/0617* (2013.01);
(Continued)

(58) Field of Classification Search
CPC ................. H04L 27/2691; H04L 27/26; H04L 2025/03426; H04B 7/0617; H04B 7/063;
(Continued)

(56) References Cited

U.S. PATENT DOCUMENTS 7,782,751 B1 * 8/2010 Lee ...................... H04J 11/0063
370/206
2011/0039497 A1    2/2011 Hammarwall et al.
(Continued)

FOREIGN PATENT DOCUMENTS

EP       1229669 A1    8/2002
JP    2013098783 A    5/2013
(Continued)

OTHER PUBLICATIONS

International Search Report dated Oct. 7, 2016 in connection with International Patent Application No. PCT/KR2016/007129.
(Continued)

*Primary Examiner* — Obaidul Huq

(57) ABSTRACT

The present disclosure relates to a pre-$5^{th}$-Generation (5G) or 5G communication system to be provided for supporting higher data rates Beyond $4^{th}$-Generation (4G) communication system such as Long Term Evolution (LTE). The present invention provides a method and a device for cancelling inter-symbol interference in a wireless communication system. A method for a base station in a wireless communication system can comprises the steps of: transmitting multiple synchronous signals through multiple antennas to a terminal; receiving information on a propagation delay difference among the multiple synchronous signals from the terminal; and determining signal transmission timing for each of the multiple antennas on the basis of the information on the propagation delay difference.

19 Claims, 17 Drawing Sheets

(51) Int. Cl.
*H04W 56/00* (2009.01)
*H04B 7/08* (2006.01)
*H04B 7/26* (2006.01)
*H04L 25/03* (2006.01)

(52) U.S. Cl.
CPC ........... *H04B 7/0673* (2013.01); *H04L 27/26* (2013.01); *H04W 56/004* (2013.01); *H04W 56/0015* (2013.01); *H04W 56/0065* (2013.01); *H04B 7/086* (2013.01); *H04B 7/2678* (2013.01); *H04L 2025/03426* (2013.01)

(58) Field of Classification Search
CPC .... H04B 7/0673; H04B 7/086; H04B 7/2678; H04W 56/0015; H04W 56/004; H04W 56/0065
USPC ......................................... 370/310, 328, 329
See application file for complete search history.

(56) References Cited

U.S. PATENT DOCUMENTS

| | | | |
|---|---|---|---|
| 2011/0244887 A1* | 10/2011 | Dupray | G01C 21/206 455/456.2 |
| 2012/0182874 A1 | 7/2012 | Siomina et al. | |
| 2013/0301619 A1 | 11/2013 | Singh et al. | |
| 2014/0029586 A1 | 1/2014 | Loehr et al. | |
| 2014/0098695 A1 | 4/2014 | Jeong et al. | |
| 2014/0177561 A1 | 6/2014 | Yu et al. | |
| 2014/0314167 A1 | 10/2014 | Jeong et al. | |

FOREIGN PATENT DOCUMENTS

| | | |
|---|---|---|
| KR | 1020140045752 A | 4/2014 |
| KR | 1020140081754 A | 7/2014 |
| KR | 1020150013283 A | 2/2015 |

OTHER PUBLICATIONS

Written Opinion of the International Searching Authority dated Oct. 7, 2016 in connection with International Patent Application No. PCT/KR2016/007129.
"Part 11: Wireless LAN Medium Access Control (MAC) and Physical Layer (PHY) Specifications; Amendment 3: Enhancements for Very High Throughput in the 60 GHz Band", IEEE Std 802.11ad, Dec. 28, 2012, 628 pages.
"Part 11: Wireless LAN Medium Access Control (MAC) and Physical Layer (PHY) Specifications; Amendment 5: Enhancements for Higher Throughput", IEEE Std 802.11n, Oct. 29, 2009, 536 pages.
Supplementary European Search Report dated Jun. 15, 2018 in connection with European Patent Application No. 16 82 1595.
Communication pursuant to Article 94(3) EPC dated Aug. 6, 2019 in connection with European Patent Application No. 16 821 595.2, 8 pages.

* cited by examiner

METHOD AND DEVICE FOR CANCELLING INTER-SYMBOL INTERFERENCE IN WIRELESS COMMUNICATION SYSTEM

CROSS-REFERENCE TO RELATED APPLICATIONS AND CLAIM OF PRIORITY

The present application claims priority under 35 U.S.C. § 365 and is a 371 National Stage of International Application No. PCT/KR2016/007129 filed Jul. 1, 2016, which claims priority to Korean Patent Application No. 10-2015-0095468 filed Jul. 3, 2015, the disclosures of which are fully incorporated herein by reference into the present disclosure as if fully set forth herein.

TECHNICAL FIELD

The present invention relates to a method and an apparatus for cancelling inference between symbols in a wireless communication system.

BACKGROUND

In order to meet wireless data traffic demands, which have increased since the commercialization of a 4G communication system, efforts to develop an improved 5G communication system or a pre-5G communication system have been made. For this reason, the 5G communication system or the pre-5G communication system is called a beyond-4G-network communication system or a post-LTE system.

In order to achieve a high data transmission rate, implementation of the 5G communication system in an mmWave band (for example, a 60 GHz band) is being considered. In the 5G communication system, technologies such as beam-forming, massive Multi-Input Multi-Output (MIMO), Full Dimensional MIMO (FD-MIMO), array antenna, analog beam-forming, and large-scale antenna technologies are being discussed to mitigate propagation path loss in the mmWave band and increase propagation transmission distance.

Further, technologies such as an evolved small cell, an advanced small cell, a cloud Radio Access Network (cloud RAN), an ultra-dense network, Device-to-Device communication (D2D), a wireless backhaul, a moving network, cooperative communication, Coordinated Multi-Points (CoMP), and interference cancellation have been developed to improve the system network in the 5G communication system.

In addition, the 5G system has led to the development of Advanced Coding Modulation (ACM) schemes such as Hybrid FSK and QAM Modulation (FQAM) and Sliding Window Superposition Coding (SWSC), and advanced access technologies such as Filter Bank Multi Carrier (FBMC), Non-Orthogonal Multiple Access (NOMA), and Sparse Code Multiple Access (SCMA).

The communication standard of the mmWave band has considered only Single-Input Multiple-Output (SISO) transmission to date. However, when Multiple-Input Multiple-Output (MUMO) transmission is considered in the future, a propagation delay difference may occur between different types of beamforming signals, and accordingly, Inter-Symbol Interference (ISI) may occur between multiple antenna signals.

In general, a Cyclic Prefix (CP) interval should be sufficiently increased to solve the inter-symbol interference in an Orthogonal Frequency Division Multiplexing (OFDM) communication scheme. However, if the CP interval is increased, transmission power and transmission band efficiency may significantly decrease due to an increase in overhead. Conversely, when the OFDM symbol size is increased to reduce a CP ratio, it is difficult to estimate a phase error of an mmWave RF circuit and also to guarantee time coherence of channels within the symbol interval.

SUMMARY

Accordingly, an embodiment of the present invention provides a method and an apparatus for preventing the generation of Inter-Symbol Interference (ISI) in a Multiple-Input Multiple-Output (MIMO) system in an mmWave band.

An embodiment of the present invention provides a method and an apparatus for compensating for a propagation delay difference between a plurality of antennas by a base station in a MIMO system that supports an mmWave band and beamforming.

An embodiment of the present invention provides a method and an apparatus for transmitting information on a propagation delay difference between a plurality of antennas to a BS by an MS in a MIMO system that supports an mmWave band and beamforming.

According to an embodiment of the present invention, a method performed by a Base Station (BS) in a wireless communication system includes: transmitting a plurality of synchronization signals to a Mobile Station (MS) through a plurality of antennas; receiving information on a Propagation Delay Difference (PDD) between the plurality of synchronization signals from the MS; and determining a transmission time point of a signal for each of the plurality of antennas based on the information on the propagation delay difference.

According to an embodiment of the present invention, a method performed by a Mobile Station (MS) in a wireless communication system includes: receiving a plurality of synchronization signals from a Base Station (BS); and determining a Propagation Delay Difference (PDD) between the plurality of received synchronization signals.

According to an embodiment of the present invention, an apparatus of a Base Station (BS) in a wireless communication system includes: a transceiver connected to a plurality of antennas; and a controller configured to transmit, through the transceiver, a plurality of synchronization signals to a Mobile Station (MS) through a plurality of antennas, receive information on a propagation delay difference between the plurality of synchronization signals from the MS, and determine a transmission time point of a signal for each of the plurality of antennas based on the information on the propagation delay difference.

According to an embodiment of the present invention, an apparatus of a Mobile Station (MS) in a wireless communication system includes: a transceiver connected to a plurality of antennas; and a controller configured to receive a plurality of synchronization signals from a Base Station (BS), determine a Propagation Delay Difference (PDD) between the plurality of received synchronization signals, and transmit information on the propagation delay difference to the BS.

According to an embodiment of the present invention, the BS may receive information on a propagation delay difference between a plurality of antennas from an MS and transmit a signal after compensating for the propagation delay difference between the plurality of antennas based on the received antenna in a MIMO system that supports an mmWave band and beamforming, thereby preventing inter-symbol interference from being generated between a plurality of antenna streams.

BRIEF DESCRIPTION OF THE DRAWINGS

The following description is made with reference to the accompanying drawings for a more complete understanding of the present invention and effects thereof, and the same reference numerals indicate the same parts.

DETAILED DESCRIPTION

Figure 1:
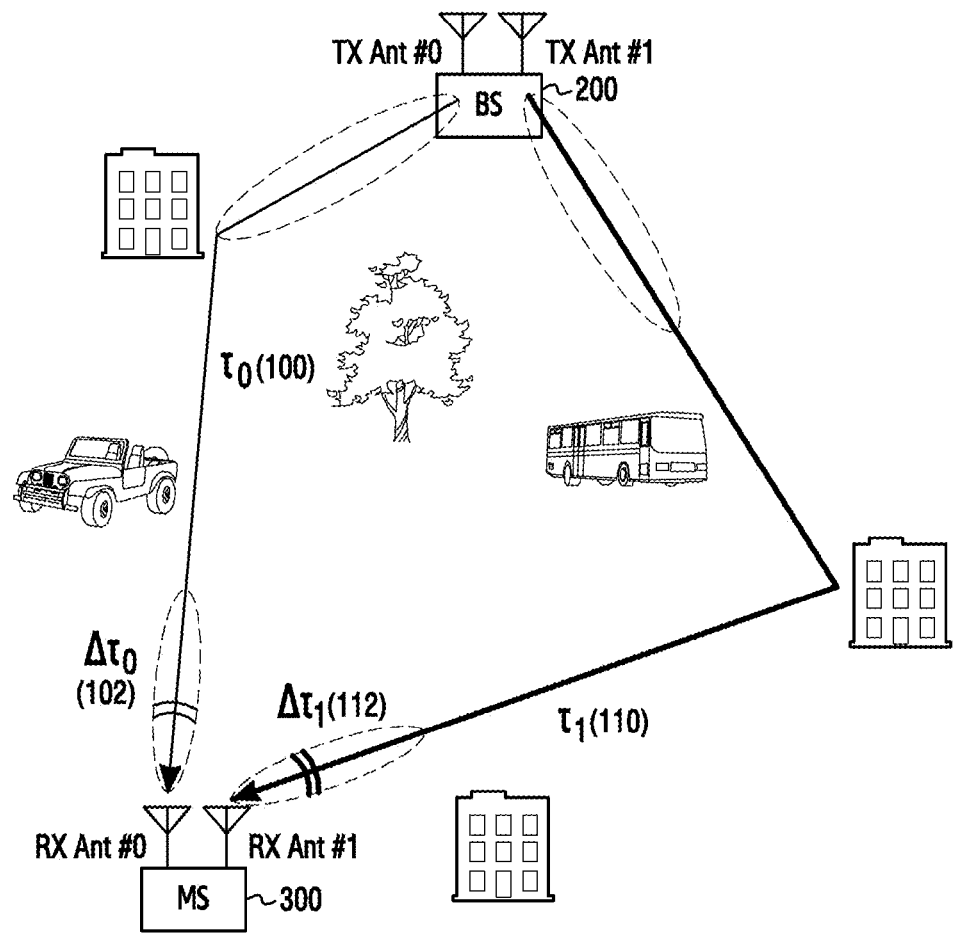
FIG. 1 illustrates a beamforming MIMO system to which embodiments of the present invention are applied.

Hereinafter, embodiments of the present invention will be described in detail with reference to the accompanying drawings. In the following description, it should be noted that only portions required for comprehension of operations according to the embodiments of the present invention will be described and descriptions of other portions will be omitted not to make subject matters of the present invention obscure. The terms which will be described below are terms defined in consideration of the functions in embodiments of the present invention, and may vary depending on users, intentions of operators, or customs. Therefore, the definitions of the terms should be made based on the contents throughout the specification.

The present invention may have various modifications and various embodiments, among which specific embodiments will now be described more fully with reference to the accompanying drawings. However, it should be understood that the present invention is not limited to the specific embodiments, but the present invention includes all modifications, equivalents, and alternatives within the spirit and the scope of the present invention. Accordingly, in this patent specification, FIGS. 1 to 17 used for describing the principles of the present invention are merely for examples and should not be construed to limit the scope of the present invention.

Hereinafter, a method and an apparatus for preventing the generation of Inter-Symbol Interference (ISI) for a plurality of antennas by compensating for a propagation delay difference for the plurality of antennas by a Base Station (BS) in a Multiple-Input Multiple-Output (MIMO) system that supports an mmWave band and beamforming will be described.

An Orthogonal Frequency Division Multiplexing (OFDM)-based communication system using an mmWave band operates at a very high sample rate in order to process a very wide bandwidth (for example, 5G Testbed—1228 MHz, WiGig (802.11ad)-2640 MHz, and the like). Accordingly, an absolute time of the Cyclic Prefix (CP) becomes very short in the OFDM)-based communication system using an mmWave band. For example, a ratio of the CP in the WiGig specification is 25%, which is relatively high compared to OFDM, but the absolute time is very short, namely 48.4 ns, which is 1/100 of 4.7 us corresponding to the CP interval defined in the current LTE specification. In general, in order to solve the problem of delay spread generated in a channel, the CP interval may be set to be longer than the delay spread. However, in the case of a single stream, inter-symbol interference is not generated even by the short CP interval. This is because a transmitted signal strength is concentrated in a particular direction through the use of beamforming technology in the mmWave band and thus the delay spread generated in the channel becomes sufficiently small. Accordingly, the short CP interval is enough to cover the delay spread of a radio signal.

However, when multiple streams are transmitted in the mmWave band through beamforming technology, a propagation delay difference may be generated between streams using different types of beamforming, and accordingly, inter-symbol interference may occur between antenna signals. For example, 48.4 ns, which is a CP interval of the WiGig specification, may be converted into a propagation movement distance of 14.5 m, which is a relatively short distance based on a comparison with a cell radius of several meters required by a mobile environment. Accordingly, it is expected that covering a difference between various channel paths by a current CP interval is difficult in the MIMO system using the mmWave band, and inter-symbol interference between a plurality of antennas may be generated.

Figure 2:
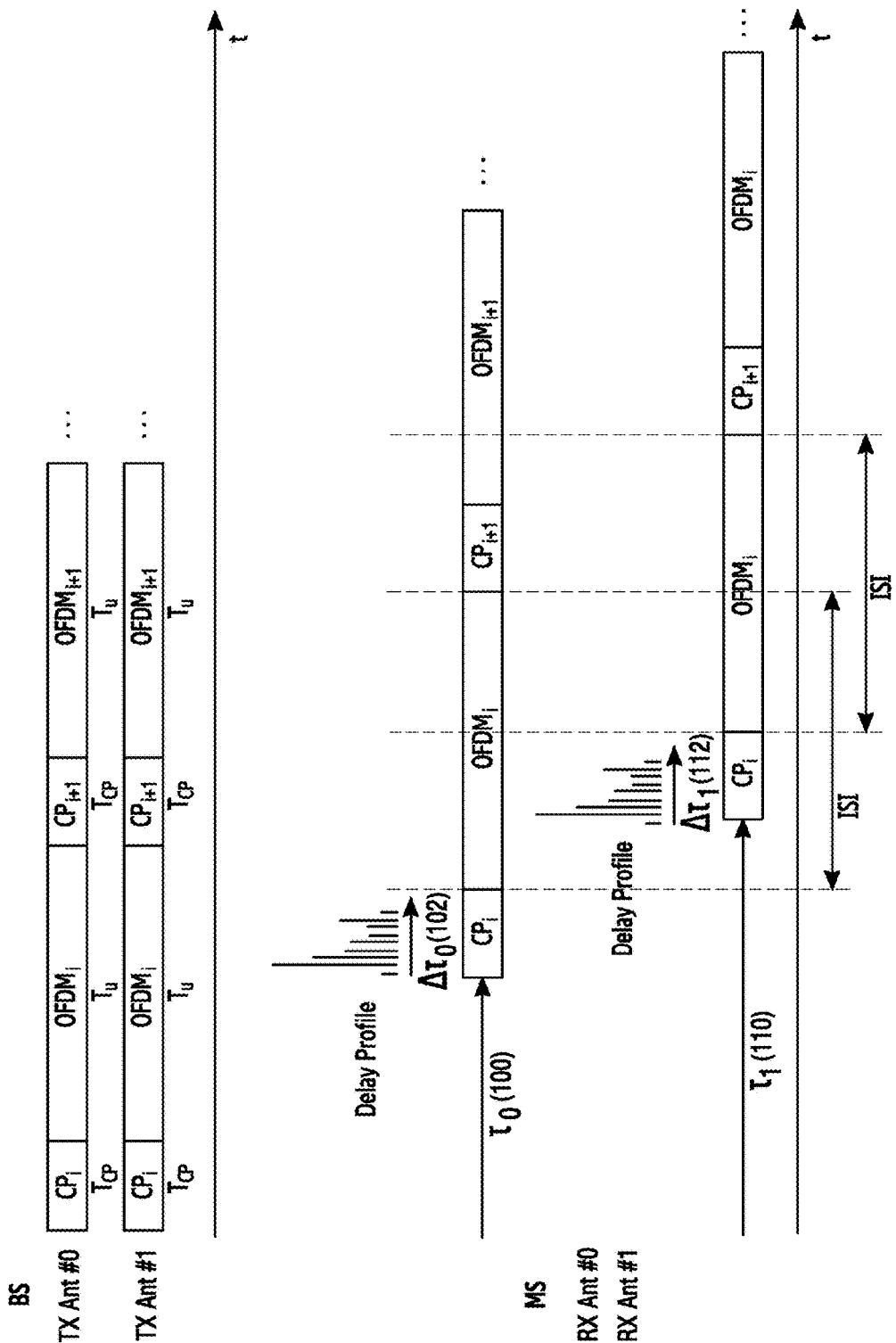
FIG. 2 illustrates a signal transmission/reception time point between a BS and an MS in a beamforming MIMO system to which embodiments of the present invention are applied.

FIG. 1 illustrates a beamforming MIMO system to which embodiments of the present invention are applied, and FIG. 2 illustrates the time point at which a BS and a Mobile Station (MS) transmit and receive a signal in the beamforming MIMO system to which embodiments of the present invention are applied.

First, referring to FIG. 1, a BS 200 and an MS 300 may support beamforming. For example, the BS 200 may transmit signals using different beams through a plurality of transmission antennas (for example, TX Ant. #0 and TX Ant. #1), and the MS 300 may receive signals using different beams through a plurality of reception antennas (for example, RX Ant. #0 and RX Ant. #1). At this time, respective signals, which the BS 200 transmits through different beams, are transmitted to the MS 300 through different independent channel paths. For example, a signal, which the BS 200 transmits using a particular beam through TX Ant. #0, reaches RX Ant. #0 of the MS 300 after experiencing a propagation delay of $\tau_0$ 100. At this time, the signal, which the MS 300 receives using the particular beam through RX Ant. #0, experiences a delay spread of $\Delta\tau_0$ 102. Further, a signal, which the BS 200 transmits using a particular beam through TX Ant. #1, reaches RX Ant. #1 of the MS 300 after experiencing a propagation delay of $\tau_0$ 110. At this time, the signal that the MS 300 receives using the particular beam through RX Ant. #1 experiences a delay spread of $\Delta\tau_0$ 112.

The MS 300 receives a signal by performing beamforming in an optimal beam direction of each reception antenna. In this case, it is possible to reduce the strength of an interference signal compared to the conventional method of receiving a signal through an omnidirectional antenna. However, due to the effects of a transmission/reception beam width and a reception antenna side lobe, an interference signal having considerable strength is actually generated. Accordingly, as illustrated in FIG. 2, when the sum of the difference ($|\tau-\tau 1|$) between the propagation delay $\tau 0$ 100 of the signal received by the MS 300 through RX Ant. #0 and the propagation delay $\tau 1$ 110 of the signal received through RX Ant. #1 and the delay spread ($\Delta\tau$) is larger than the CP interval, inter-symbol interference may be generated between signal streams received through RX Ant. #0 and RX Ant. #1. That is, in order to prevent the generation of inter-symbol interference between the signal streams received through RX Ant. #0 and RX Ant. #1, Equation (1) below should be satisfied.

$$\max(\Delta\tau_0, \Delta\tau_1, |\tau_0 - \tau_1| + \Delta\tau) < T_{CP} \qquad \text{Equation (1)}$$

$$\Delta\tau = \begin{cases} \Delta\tau_0, & \tau_0 \geq \tau_1 \\ \Delta\tau_1, & \tau_0 < \tau_1 \end{cases}$$

In Equation (1), $\Delta\tau_0$ denotes delay spread of a signal of TX Ant. #0, $\Delta\tau_1$ denotes delay spread of a signal of TX Ant. #1, $\tau_0$ denotes a propagation delay of the signal of TX Ant. #0, and $\tau_1$ denotes a propagation delay of the signal of TX Ant. #1.

In Equation (1), $\Delta\tau_0$ and $\Delta\tau_1$, which are delay spreads for signal streams, are smaller than a TCP corresponding to the CP interval according to the definition of the SISO specification, and thus there is no problem. However, $|\tau_0-\tau_1|+\Delta\tau$, which is generated by the sum of path difference between signal streams and the propagation delay, becomes a problem. Since the conventional mobile communication scheme, such as LTE, uses an omnidirectional antenna, the difference between the two streams of the multi-antenna is not large. However, in the case of mmWave communication using beamforming, a channel path is definitely different for each beam, and thus the influence of the propagation delay difference cannot be ignored. As a result, when a MIMO signal is transmitted in the mmWave band using beamforming technology, the influence of the propagation delay difference between antenna signals may be generated.

In order to satisfy Equation (1) above, a method of increasing the CP interval is provided. However, if the CP interval increases, transmission power and transmission band efficiency may significantly decrease due to the increase in overhead. Conversely, when the OFDM symbol size is increased to thus reduce a CP ratio, it is difficult to estimate the phase error of an mmWave RF circuit and also to guarantee time coherence of channels within the symbol interval.

Accordingly, the following embodiment of the present invention proposes fundamental solutions for preventing the generation of inter-symbol interference between a plurality of antenna signals in the MIMO system using the mmWave band and beamforming.

Embodiments described below can be applied to all of a Multiple-Input Single-Output (MISO) system including a transmission side having two or more antenna chains and a MIMO system including a transmission side and a reception side, each of which has two or more antenna chains. However, for convenience of description, the following embodiments will be described based on the assumption of a 2×2 MIMO system in which the transmission side has two antenna chains (n=2) and the reception side has two antenna chains (m=2).

Figure 3:
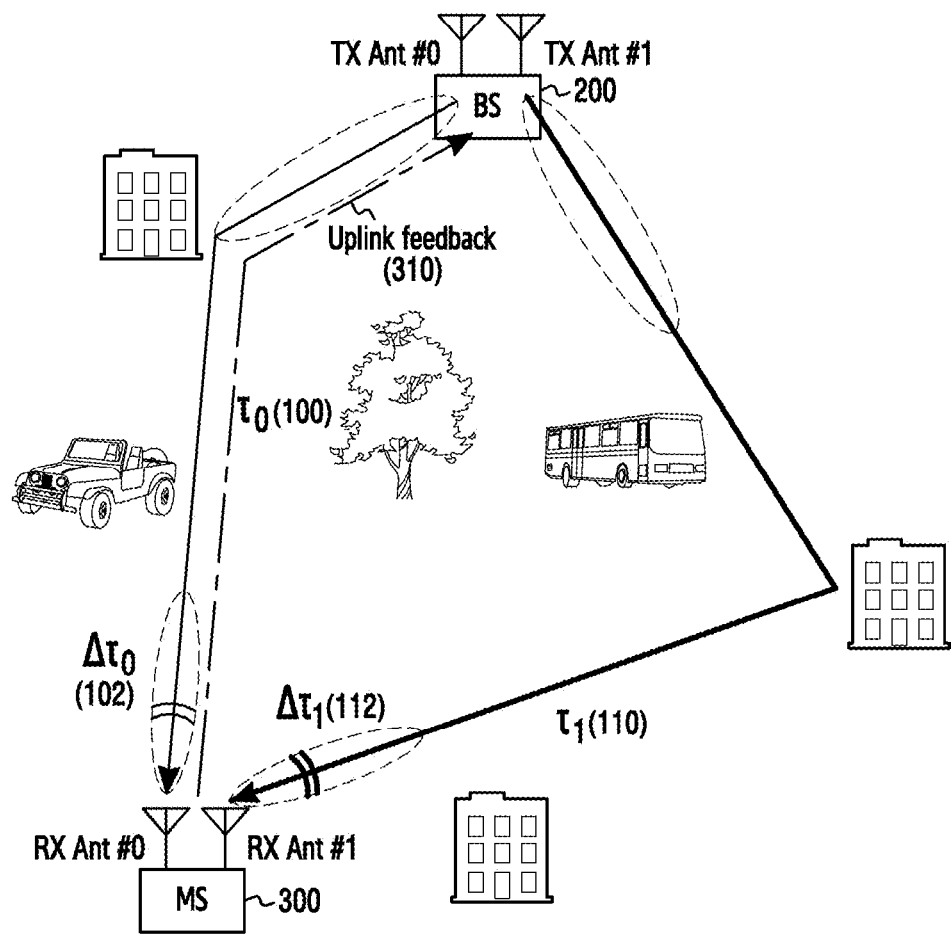
FIG. 3 illustrates uplink feedback of the MS in a beamforming MIMO system according to an embodiment of the present invention.
Figure 4:
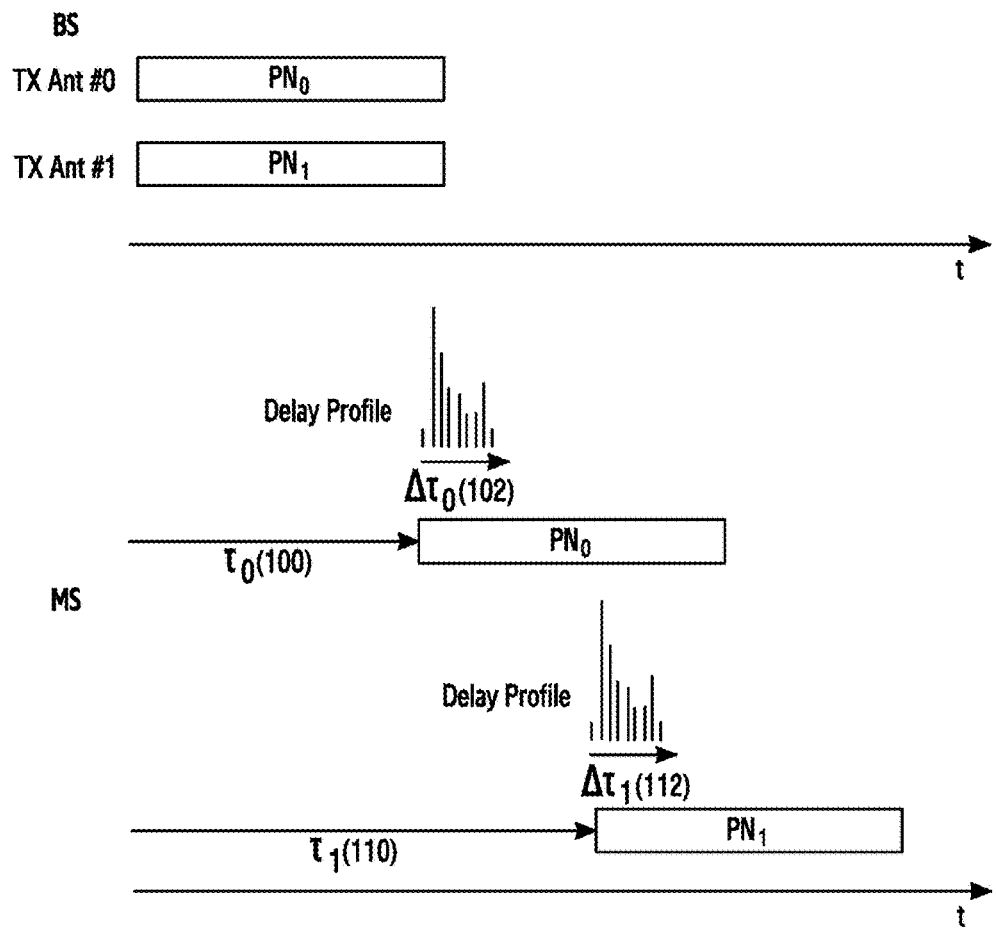
FIG. 4 illustrates a synchronization signal transmission/reception time point between the BS and the MS in a beamforming MIMO system according to an embodiment of the present invention.
Figure 5:
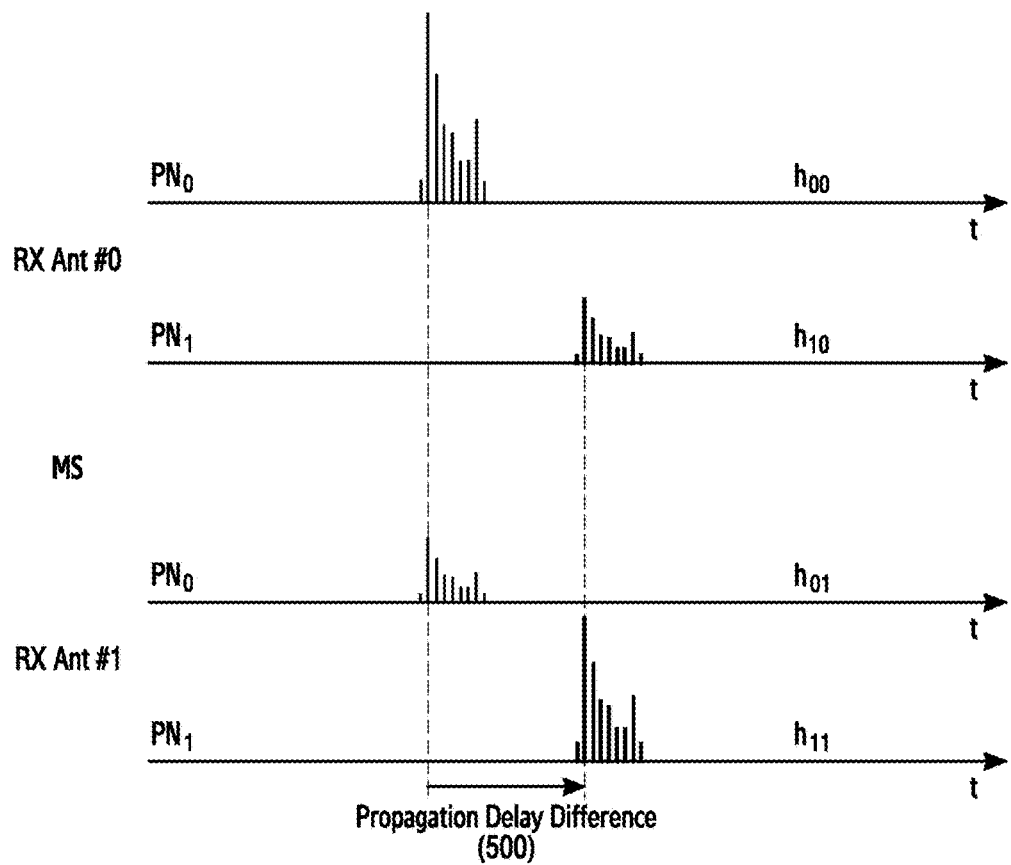
FIG. 5 illustrates a cross-correlation result of a signal received for each reception antenna in a beamforming MIMO system according to an embodiment of the present invention.

FIG. 3 illustrates uplink feedback of the MS in a beamforming MIMO system according to an embodiment of the present invention. Further, FIG. 4 illustrates the time point at which the BS and the MS transmit and receive synchronization signals in the beamforming MIMO system according to an embodiment of the present invention.

Referring to FIG. 3, the BS 200 and the MS 300 may support beamforming. The BS 200 according to an embodiment of the present invention may transmit independent signals through different beams using a plurality of transmission antennas (for example, TX Ant. #0 and TX Ant. #1). Further, the MS 300 may receive signals through different beams using a plurality of reception beams (for example, RX Ant. #0 and RX Ant. #1). At this time, respective signals, which the BS 200 transmits through different beams, are transmitted to the MS 300 through different independent channel paths. For example, the BS 200 transmits synchronization signals, which can be distinguished from each other, through optimal transmission beams for respective antennas reported from the MS using TX Ant. #0 and TX Ant. #1. For example, as illustrated in FIG. 4, the BS 200 may transmit a first synchronization signal ($PN_0$) through a first transmission beam of TX Ant. #0, and may substantially simultaneously transmit a second synchronization signal ($PN_1$) through a second transmission beam of TX Ant. #1. The first synchronization signal and the second synchronization signal, which have been substantially simultaneously transmitted through different beams of different antennas, are received by the MS 300 after experiencing the propagation delay of different independent channel paths. For example, as illustrated in FIG. 4, the first synchronization signal ($PN_0$) transmitted using the first transmission beam of TX Ant. #0 may reach RX Ant. #0 of the MS 300 after experiencing the propagation delay of $\tau_0$ 100, and the second synchronization signal ($PN_1$) transmitted using the second transmission beam of TX Ant. #1 may reach RX Ant. #1 of the MS 300 after experiencing the propagation delay of $\tau_1$ 110.

The MS 300 may receive signals transmitted from the BS 200 by performing beamforming in optimal beam directions through RX Ant. #0 and RX Ant. #1. As illustrated in FIG. 4, the first synchronization signal ($PN_0$) received by the MS 300 through the optimal beam of RX Ant. #0 is delay-spread by $\Delta\tau_0$ 102, and the second synchronization signal ($PN_1$) received by the MS 300 through the optimal beam of RX Ant. #1 is delay-spread by $\Delta\tau_0$ 112.

The MS 300 according to an embodiment of the present invention may perform cross-correlation on the signals received through RX Ant. #0 and RX Ant. #1 and measure a Propagation Delay Difference (PDD) between the received signals based on the result of the cross-correlation. For example, the MS 300 may measure a difference ($|\tau_0-\tau_1|$) between the propagation delay $\tau_0$ 100 for the channel between TX Ant. #0 and RX Ant. #0 and the propagation delay $\tau_1$ 110 for the channel between TX Ant. #1 and RX Ant. #1. Here, the result of the cross-correlation for the signal received through each of RX Ant. #0 and RX Ant. #1 may be expressed as FIG. 5. For example, the MS 300 may acquire a channel profile result corresponding to information $h_{00}$, $h_{01}$, $h_{10}$, and $h_{11}$ on a channel H by performing cross-correlation on the signals received through the antennas. $h_{ij}$ may indicate information on a channel between an $i^{th}$ transmission antenna and a $j^{th}$ reception antenna.

Since the BS 200 simultaneously transmitted the first synchronization signal ($PN_0$) and the second synchronization signal ($PN_1$), the time difference between a first received synchronization signal of the channel profiles $h_{00}$ and $h_{01}$ and a second synchronization signal of channel profiles $h_{10}$ and $h_{11}$ may be a propagation delay difference between two channels. Accordingly, the MS 300 may determine that the difference between a first received synchronization signal among the received synchronization signal ($PN_0$) corresponding to $h_{00}$ and the received synchronization signal ($PN_1$) corresponding to $h_{10}$ and a second received synchronization signal among the received synchronization signal ($PN_0$) corresponding to $h_{10}$ and the received synchronization signal ($PN_1$) corresponding to $h_{11}$ is a propagation delay difference 500. When it is determined that the cross-correlation between a plurality of antennas is low, the MS 300 may determine a propagation delay difference in a direction that minimizes interference of both received signals based on the channel profiles $h_{00}$, $h_{10}$, $h_{01}$, and $h_{11}$, which are the signals of the reception antennas.

According to some embodiments, since the BS 200 also transmits preamble signals for synchronization in optimal directions in every packet in a packet-type communication system, the MS 300 may measure the propagation delay difference in every packet. According to another embodiment, since the BS 200 transmits synchronization signals while changing beams in every symbol in a frame-type communication system, the MS 300 may acquire a synchronization time point based on symbols of the optimal beams for respective antenna chains and compensate for a time difference between the two symbols in order to measure the propagation delay difference.

The MS 300 may transmit an uplink feedback signal 310 including information (or referred to as "PDD information") on the measured propagation delay difference ($|\tau_0-\tau_1|$) to the BS 200. In addition, the MS 300 may determine an optimal transmission/reception beam based on the result of the received synchronization signal and transmit information on the determined optimal transmission/reception beam to the BS 200. The MS 300 may transmit PDD information to the BS 200 through an uplink control signal. For example, the MS 300 may add a field indicating the PDD information to the uplink control signal and then transmit the uplink control signal to the BS 200.

The BS 200 receives an uplink feed signal including the PDD information from the MS 300. The BS 200 may compensate for the propagation delay difference between the signals (for example, data signals) transmitted through TX Ant. #0 and TX Ant. #1 based on the received PDD information. The PDD information assumes that the second synchronization signal transmitted through TX Ant. #1 reaches the MS 300 later than the first synchronization signal transmitted through TX Ant. #0 by the propagation delay difference. According to some embodiments, the BS 200 may delay the signal to be transmitted through TX Ant. #0 by the propagation delay difference based on the received PDD information. For example, the BS 200 may perform control to delay a transmission time point of the first signal to be later than a time point of the second signal rather than simultaneously transmitting the first signal corresponding to TX Ant. #0 and the second signal corresponding to TX Ant. #1 through respective antennas. According to another embodiment, the BS 200 may transmit the signal to be transmitted through TX Ant. #1 to the MS 300 earlier by an amount of time equal to the propagation delay difference based on the received PDD information. For example, the BS 200 may control the transmission of the first signal to be earlier than the transmission of the second signal by the propagation delay difference rather than simultaneously transmitting the first signal corresponding to TX Ant. #0 and the second signal corresponding to TX Ant. #1 through respective antennas. According to another embodiment, the BS 200 may control the time point at which the signal to be transmitted through TX Ant. #0 is generated and the time point at which the signal to be transmitted through TX Ant. #0 is generated based on the PDD information. For example, the BS 200 may generate the first signal earlier than the second signal by the propagation difference rather than simultaneously generating the first signal corresponding to TX Ant. #0 and the second signal corresponding to TX Ant. #1.

As described above, the BS 200 may compensate for the propagation delay difference between the signals transmitted through the plurality of antennas based on the PDD information and then transmit the signals. Accordingly, the signals transmitted through the plurality of antennas reach the MS 300 at the same time, and thus it is possible to prevent inter-symbol interference generated between signal streams received through a plurality of reception antennas of the MS 300.

Figure 6:
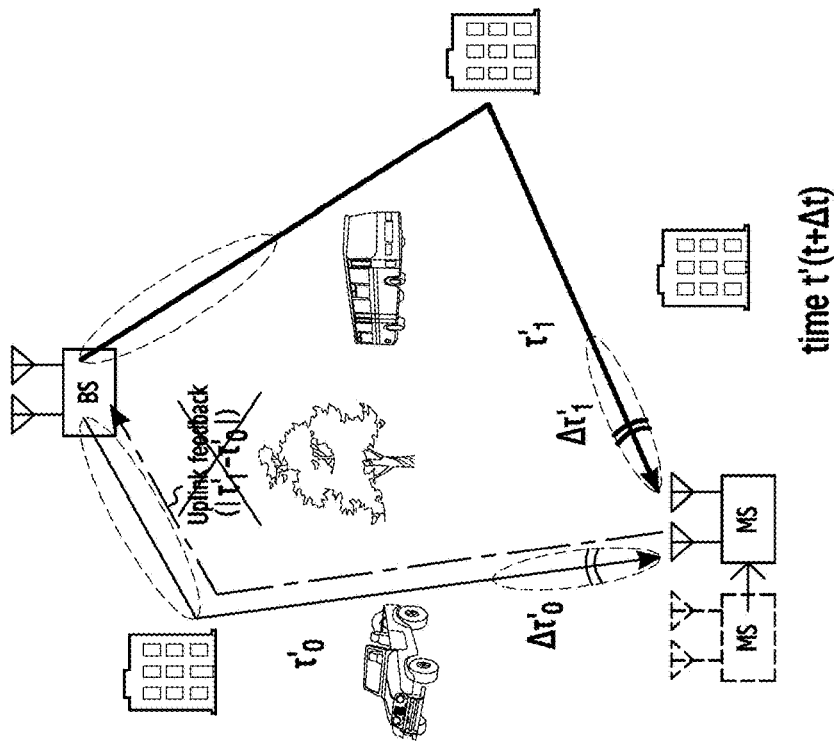
FIG. 6 illustrates omission of uplink feedback of the MS according to movement of the MS in a beamforming MIMO system according to an embodiment of the present invention.
Figure 6:
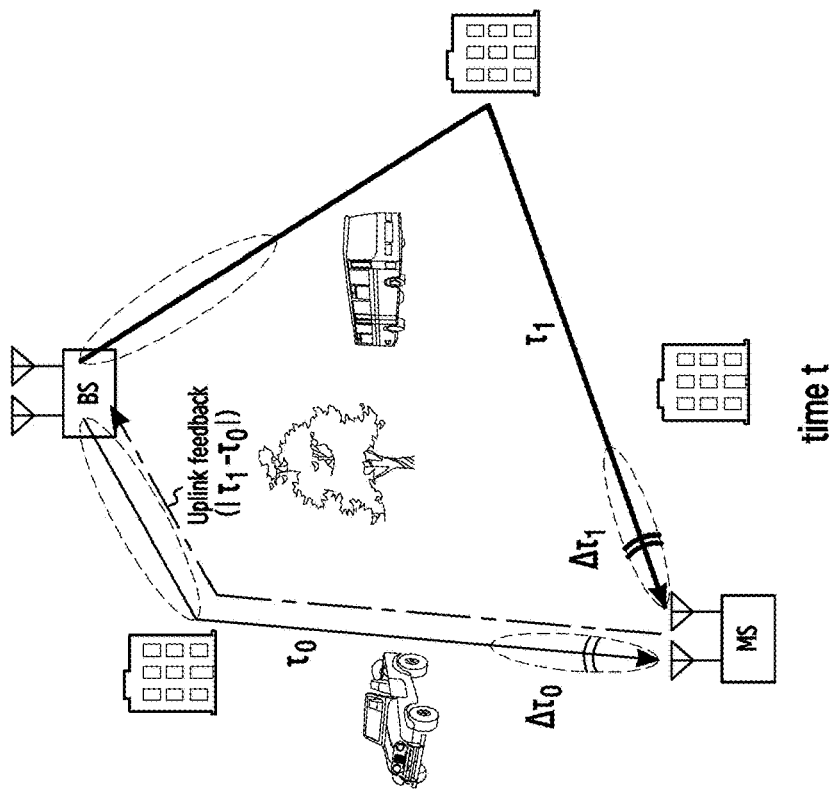
Figure 7:
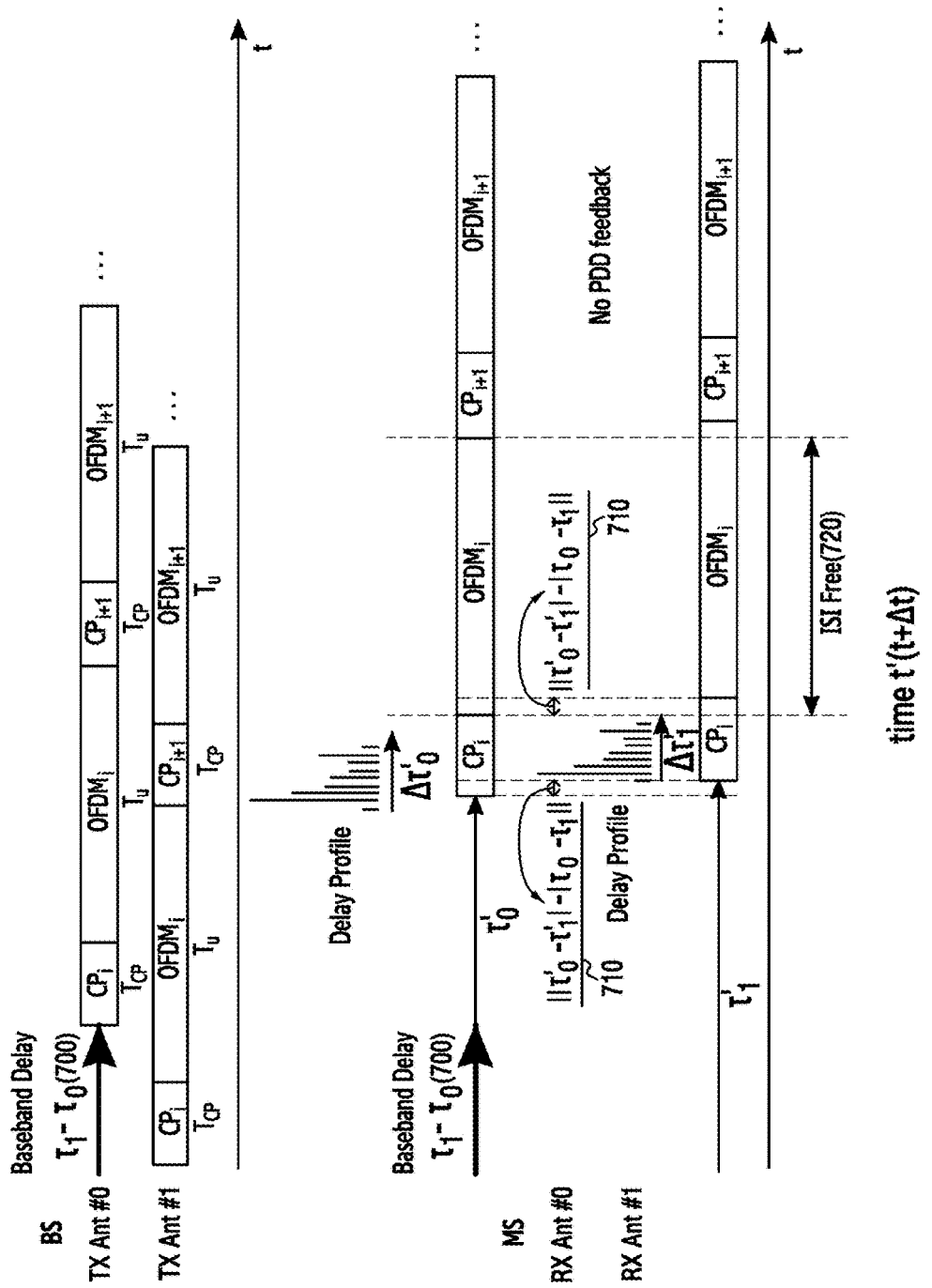
FIG. 7 illustrates a signal transmission/reception time point between the BS and the MS according to compensation for a propagation delay difference in a beamforming MIMO system according to an embodiment of the present invention.

FIG. 6 illustrates omission of uplink feedback of the MS based on movement of the MS in a beamforming MIMO system according to an embodiment of the present invention, and FIG. 7 illustrates time points when the BS and the MS transmit and receive signals based on compensation for a propagation delay difference in a beamforming MIMO system according to an embodiment of the present invention.

Referring to FIG. 6, the MS 300 may measure a propagation delay difference between synchronization signals received from the BS 200 at a first synchronization time point (t) and transmit information (PDD information) on the measured propagation delay difference to the BS 200. Accordingly, the BS 200 may compensate for the propagation delay difference between signals transmitted through a plurality of antennas and transmit the signals having the compensated propagation delay difference to the MS 300.

Thereafter, the MS 300 may receive again synchronization signals from the BS 200 at a second synchronization time point (t+Δt) and measure a propagation delay difference based on the received synchronization signals. At this time, the propagation delay difference measured at the second synchronization time point (t+Δt) may be the same as or similar to the propagation delay difference measured and reported at the first synchronization time point (t). For example, although the MS 300 reported information on the propagation delay difference to the BS 200 at the first synchronization time point (t), the same or similar propagation delay difference may be measured at the second synchronization time point (t+Δt). This is because the BS 200 compensates for the propagation delay difference only for the control signal and the data signal without compensating for the propagation delay difference for the synchronization signal due to the fixed synchronization time point between the BS 200 and the MS 300. Accordingly, even though the propagation delay difference measured at the second synchronization time point (t+Δt) is the same as or similar to the propagation delay difference measured at the first synchronization time point (t), the MS 300 does not report information on the corresponding propagation delay difference to the BS 200 when ISI is not generated in an interval in which the control signal and the data signal are received.

The MS 300 may determine whether ISI is generated in the interval in which the control signal and the data signal are received based on channel information at the first synchronization time point and channel information at the second synchronization time point. For example, the MS 300 may determine whether ISI is generated based on Equation (2) below.

$$\|\tau'_0 - \tau'_1| - |\tau_0 - \tau_1\| + \Delta\tau' \le T_{CP} \qquad \text{Equation (2)}$$

$$\Delta\tau' = \begin{cases} \Delta\tau'_0, & \tau'_1 - \tau'_0 \le \tau_1 - \tau_0 \\ \Delta\tau'_1, & \tau'_1 - \tau'_0 > \tau_1 - \tau_0 \end{cases}$$

$\tau_0$ denotes a propagation delay of a signal of TX Ant. #0 corresponding to the first synchronization time point, and $\tau_1$ denotes a propagation delay of a signal of TX Ant. #1 corresponding to the first synchronization time point. Further, $\tau'_0$ denotes a propagation delay of a signal of TX Ant. #0 corresponding to the second synchronization time point, and $\tau'_1$ denotes a propagation delay of a signal of TX Ant. #1 corresponding to the second synchronization time point. In addition, $\Delta\tau'_0$ denotes propagation spread of a signal of TX Ant. #0 corresponding to the second synchronization time point, and $\Delta\tau'_1$ denotes propagation spread of a signal of TX Ant. #1 corresponding to the second synchronization time point.

When channel information $\tau_0$ and $\tau_1$ at the first synchronization time point and channel information $\tau'_0$ and $\tau'_1$ at the second synchronization time point satisfy Equation (2), the MS 300 may determine that ISI is not generated in the interval in which the control signal and the data signal are received. The MS 300 may determine that a report on the propagation delay difference to the BS 200 is not needed.

For example, as illustrated in FIG. 7, the BS 200 may transmit the signal transmitted through TX Ant. #0 with a delay equal to a propagation delay difference 700 (τ1−τ0) based on information (|τ1−τ0|) on the propagation delay difference at the first synchronization time point. At this time, a signal, which the BS 200 transmits through a particular beam using TX Ant. #0, reaches RX Ant. #0 of the MS 300 after experiencing a propagation delay of $\tau'_1$. A signal, which the MS 300 receives through a particular beam using RX Ant. #1, may be delay-spread by $\Delta\tau'_1$. Further, a signal, which the BS 200 transmits through a particular beam using TX Ant. #0, reaches RX Ant. #0 of the MS 300 after experiencing a propagation delay of $\tau'_0$. A signal, which the MS 300 receives through a particular beam using RX Ant. #0, may be delay-spread by $\Delta\tau'_0$. As illustrated in FIG. 7, since ||τ'1−τ'0|−|τ1−τ0|| 720 and Δτ are equal to or shorter than the CP interval, interference may not be generated between an OFDM symbol received through RX Ant. #0 and an OFDM symbol received through RX Ant. #1, as indicated by reference numeral 720.

Figure 8:
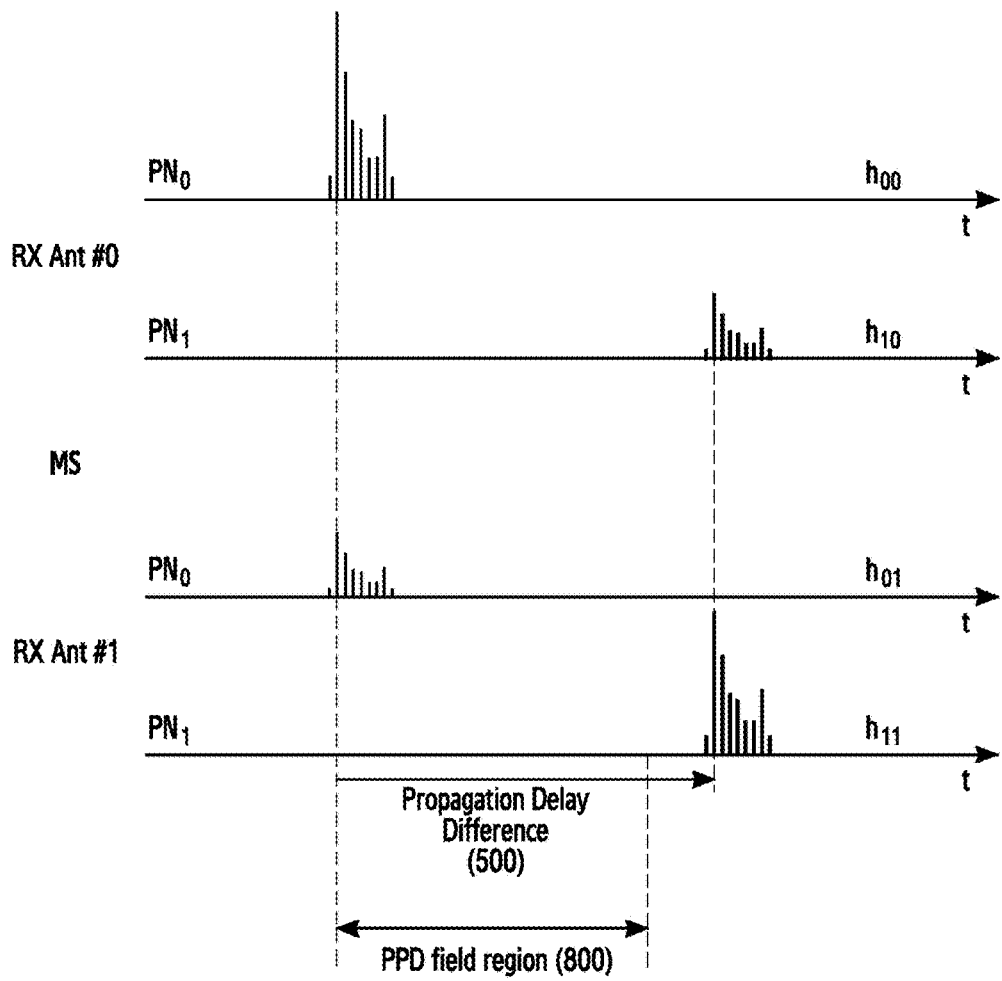
FIG. 8 illustrates an example in which a beam candidate that takes into account a propagation delay difference is excluded in a beamforming MIMO system according to an embodiment of the present invention.

FIG. 8 illustrates an example in which a beam candidate that takes into account a propagation delay difference is excluded in a beamforming MIMO system according to an embodiment of the present invention.

As illustrated in FIG. 8, the propagation delay difference 500 measured by the MS 300 may be larger than a PDD information field region 800. Here, the PDD information field region 800 refers to a time interval that can be expressed by the number of bits given for a PDD information field. For example, due to restriction on the number of bits that can be transmitted through an uplink, the number of bits of the PDD information field for reporting information on the propagation delay difference may be limited. Accordingly, the number of bits required for indicating the propagation delay difference 500 may be larger than the limited number of bits of the PDD information field. As described above, when the measured propagation delay difference 500 is larger than the PDD information field region 800, which can be expressed by the number of limited bits of the PDD information field, the MS 300 may determine that the measured propagation delay difference cannot be compensated for. The MS 300 may exclude a beam combination that cannot be compensated for from a beam selection candidate group. The MS 300 may select an optimal beam for each antenna based on the result of the received synchronization signal at every synchronization time point and perform control so as not to select a beam combination that cannot be compensated for.

Figure 9:
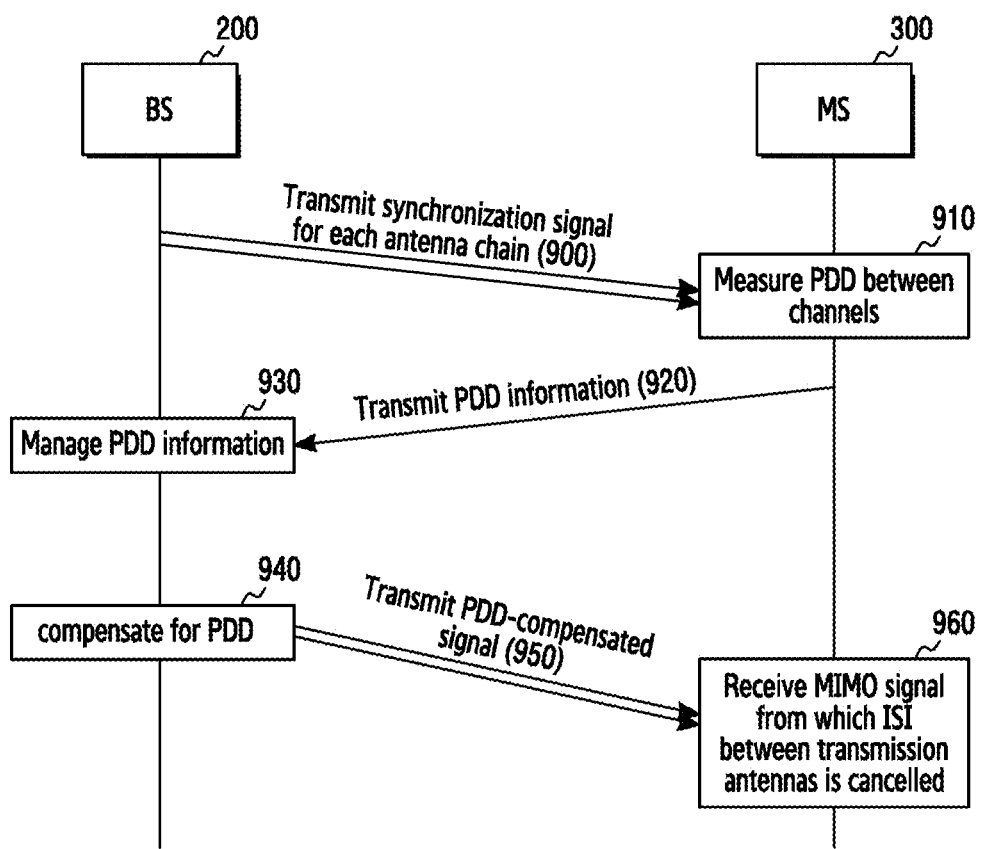
FIG. 9 illustrates a signal flow procedure between the BS and the MS in a beamforming MIMO system according to an embodiment of the present invention.

FIG. 9 illustrates a signal flow procedure between the BS and the MS in a beamforming MIMO system according to an embodiment of the present invention.

Referring to FIG. 9, the BS 200 may transmit different synchronization signals for respective antenna chains in step 900. For example, the BS 200 may generate different synchronization signals corresponding to a plurality of transmission antennas at a preset synchronization time point and simultaneously transmit the different synchronization signals to the MS 300 through the plurality of antennas. At this time, respective signals, which the BS 200 transmits through different beams, are transmitted to the MS 300 through different independent channel paths. For example, the BS 200 transmits synchronization signals, which can be distinguished from each other, through optimal transmission beams for respective antennas reported from the MS using TX Ant. #0 and TX Ant. #1. A first synchronization signal and a second synchronization signal simultaneously transmitted through optimal beams of TX Ant. #0 and TX Ant. #1 are received by the MS 300 after experiencing a propagation delay due to the different independent channel paths. For example, as illustrated in FIG. 4, the first synchronization signal transmitted through the first transmission beam of TX Ant. #0 may reach RX Ant. #0 of the MS 300 after experiencing the propagation delay of $\tau_0$ 100, and the second synchronization signal ($PN_1$) transmitted through the second transmission beam of TX Ant. #1 may reach RX Ant. #1 of the MS 300 after experiencing the propagation delay of $\tau_1$ 110. At this time, the MS 300 may receive signals transmitted from the BS 200 by performing beamforming in optimal beam directions through RX Ant. #0 and RX Ant. #1. As illustrated in FIG. 4, the first synchronization signal ($PN_0$) received by the MS 300 through the optimal beam of RX Ant. #0 is delay-spread by $\Delta\tau_0$ 102, and the second synchronization signal ($PN_1$) received by the MS 300 through the optimal beam of RX Ant. #1 is delay-spread by $\Delta\tau_0$ 112.

The MS 300 measures a propagation delay difference between channels based on the received synchronization signals in step 910. For example, the MS 300 may perform cross-correlation on the signals received through the plurality of antennas and measure the propagation delay difference based on the cross-correlation result. For example, the MS 300 may measure the difference ($|\tau 0 - \tau 1|$) between the propagation delay $\tau_0$ 100 for the channel between TX Ant. #0 and RX Ant. #0 and the propagation delay $\tau_1$ 110 for the channel between TX Ant. #1 and RX Ant. #1. The cross-correlation result for the signals received through RX Ant. #0 and RX Ant. #1 may be expressed as Equation (5). For example, the MS 300 may acquire a channel profile result corresponding to information $h_{00}$, $h_{01}$, $h_{10}$, and $h_{11}$ on a channel H by performing cross-correlation on the signals received through the antennas. At this time, the MS 300 may determine that the time difference between a first received synchronization signal of channel profiles $h_{00}$ and $h_{01}$ and a second synchronization signal of channel profiles $h_{10}$ and $h_{11}$ is a propagation delay difference generated between two channels. In addition, according to an embodiment of the present invention, when the number of bits required for indicating the measured propagation delay difference is larger than the number of bits of the predetermined PDD information field, the MS 300 may exclude a beam combination corresponding to the corresponding propagation delay difference from a beam selection candidate group. At this time, the MS 300 may select an optimal beam combination from the remaining beam combinations except for the beam combination corresponding to the corresponding propagation delay difference at the corresponding synchronization time point.

Thereafter, the MS 300 may transmit an uplink signal including PDD information to the BS 200 in step 920. When the optimal beam combination is changed, the MS 300 may transmit an uplink signal including information on the changed beam combination to the BS 200 along with the PDD information. According to some embodiments, the MS 300 may add a PDD information field to an uplink control signal and then transmit the uplink control signal to the BS 200. According to an embodiment of the present invention, the PDD information field may be configured in two types as described below.

In the first type, the PDD information field may include a first information field indicating transmission antenna information (for example, index) and at least one second information field indicating a propagation delay difference between a signal of a transmission antenna of the first information field and a signal of at least one other transmission antenna. For example, the first information field may indicate a transmission antenna of a signal which is the reference time point of the propagation delay difference. In other words, the first information field may indicate a transmission antenna of a signal, which first arrives at the MS 300, or a transmission antenna of a signal, which last arrives at the MS 300. The second information field may indicate the absolute value of the propagation delay difference between a signal of a transmission antenna indicated by the first information field and a signal of at least one other transmission antenna. For example, the first information field may indicate that a first synchronization signal transmitted through a first transmission antenna among n transmission antennas of the BS 200 arrives at the MS first. In this case, the number of second information fields may be n−1, and each of the (n−1) second information fields may indicate an absolute value of the propagation delay difference for the remaining antennas except for the first transmission antenna. In other words, each of the (n−1) second information fields may indicate an absolute value of the propagation delay difference between the first synchronization signal transmitted through the first transmission antenna and each of the synchronization signals transmitted through (n−1) other transmission antennas. Here, the length of the first information field may be $\lceil \log_2 n \rceil$ bits. Further, the length of each of the second information fields may be m bits, and the total length of the (n−1) second information fields may be (n−1)×m bits. Here, m is a number of bits corresponding to the absolute value of the propagation delay difference. Accordingly, the total number of bits of the PDD information field may be $\lceil \log_2 n \rceil + (n-1) \times m$ bits according to an embodiment of the present invention.

In the second type, the PDD information field may include at least one third information field indicating a propagation delay difference between a signal transmitted through a predetermined particular transmission antenna and a signal transmitted through at least one other transmission antenna. For example, the third information field may include (n−1) third information fields that express a propagation delay difference from the signal transmitted from at least one other transmission antenna by a negative value or a positive value based on the time point at which a signal transmitted from a predetermined particular transmission antenna among n transmission antennas is received by the MS 300. For example, when the predetermined particular transmission antenna is a first transmission antenna, the MS 300 may express a propagation delay difference between a signal of the first transmission antenna and a signal of another transmission antenna as a negative value or a positive value. For example, it is assumed that a second synchronization signal transmitted through a second transmission antenna of the BS 200 first arrives at the MS 300, a first synchronization signal transmitted through a first transmission antenna of the BS 200 arrives at the MS 300, and then a third synchronization signal transmitted through a third transmission antenna of the BS 200 arrives at the MS 300 last. At this time, the third information field indicating a propagation delay value for the second transmission antenna may express a propagation delay difference between the first synchronization signal of the first transmission antenna and the second synchronization signal of the second transmission antenna by a negative value since the signal of the second transmission antenna arrives at the MS 300 earlier than the signal of the first transmission antenna. Further, the third information field indicating a propagation delay value for the third transmission antenna may express a propagation delay difference between the third synchronization signal of the third transmission antenna and the second synchronization signal of the second transmission antenna by a positive value since the signal of the third transmission antenna arrives at the MS 300 later than the signal of the first transmission antenna. For example, by expressing the propagation delay difference by a negative value or a positive value, each of the third information fields may indicate whether the signal of the corresponding transmission antenna arrives at the MS earlier or later than a signal of a particular transmission antenna. At this time, the length of each third information field may be m+1 bits. Since the PDD information field may include (n−1) third information fields, the total length of the PDD information field may be (n−1)×(m+1) bits. In the m+1 bits, m bits may indicate an absolute value of the propagation delay difference and 1 bit may indicate whether the value is negative or positive. Accordingly, in order to reduce the number of bits added to the uplink control signal, when the number of transmission antennas of the BS 200 is large, it may be more efficient to configure the PDD information field as the first type rather than the second type. On the other hand, when the number of transmission antennas of the BS 200 is small, it may be more efficient to configure the PDD information field as the second type rather than the first type.

In addition, in order to reduce the number of bits added to the uplink control signal, the MS 300 may not directly transmit the propagation delay difference to the BS 200 but may perform transmission after adding the remaining intervals except for an interval that can be covered by the CP interval to the PDD information field. For example, after changing a value for the measured propagation delay difference into a bit sequence, the MS 300 may omit a lower Least Significant Bit (LSB) region corresponding to the CP interval in the changed bit sequence and transmit a higher Most Significant Bit (MSB) region to the BS 200. In a more detailed example, when the measured propagation delay difference is "14" and the propagation delay difference that can be covered by the CP interval is "2", the MS 300 may exclude lower bits "10", which can be covered by the CP interval, from the bit sequence "1110", corresponding to the measured propagation delay difference, add only the remaining higher bits "11" to the PDD information field, and transmit the PDD information field to the BS 200. According to some embodiments, based on a channel state, the MS 300 may directly transmit the measured propagation delay difference to the BS 200 or may transmit only the remaining higher bit region in the measured propagation delay difference, but not the lower bit region, corresponding to all or some of the CP interval, to the BS 200. A portion of the CP interval may be the remaining intervals excluding an interval corresponding to delay spread in the entire CP interval. For example, the MS 300 may directly transmit the propagation delay difference to the BS 200 in a channel state in which the measured propagation delay difference is small. On the other hand, in a channel state in which the measured propagation delay difference is large, the MS 300 may transmit only the remaining higher bit region, but not the lower bit region, corresponding to all or some of the CP interval in the propagation delay difference to the BS 200. In addition, based on a channel state, the MS 300 may exclude only a region smaller than the lower bit region corresponding to all or some of the CP interval without excluding all the lower bit region corresponding to all or some of the CP interval, and transmit the remaining higher bit region to the BS 200. Moreover, when the MS 300 excludes the lower bit region corresponding to all or some of the CP interval and transmits the PDD information field including only the remaining higher bit region to the BS 200, the MS 300 may additionally transmit a PDD exponent field indicating a bit region signified by the PDD information field. For example, when the PDD information field including higher bits "11" of the PDD information "1110" is included in an uplink control signal, the MS 300 may add only a PDD exponent field indicating that the PDD information field includes only 2 bits to the uplink control signal and may transmit the uplink control signal to the BS 200.

In addition, when the measured propagation delay difference can be covered by the CP interval or when Equation (2) is satisfied and thus it is determined that inter-symbol interference is not generated in the interval in which the control signal and the data signal are actually received, the MS 300 may not transmit PDD information. At this time, the MS 300 may not transmit the uplink control signal, or may add a 1-bit field indicating the presence or absence of the PDD information to the uplink control signal. For example, when it is determined that transmission of the PDD information is not needed, the MS 300 may add a separate field indicating the absence of the PDD information to the uplink control signal so as to minimize the amount of information contained in the uplink control signal.

The BS 200 receives the uplink control signal including the PDD information from the MS 300, acquires the PDD information from the received uplink control signal, and manages the acquired PDD information in step 930. For example, the BS 200 may manage and store information on the optimal transmission beam of the MS 300 and the received PDD information in a table.

The BS 200 may compensate for the propagation delay difference based on the received PDD information in step 940, and transmit a signal having the compensated propagation delay difference in step 950. For example, the BS 200 may compensate for the propagation delay difference between signals (for example, a control signal and a data signal) transmitted through TX Ant. #0 and TX Ant. #1 based on the received PDD information. The PDD information assumes that the second synchronization signal transmitted through TX Ant. #1 reaches the MS 300 an amount of time equal to the propagation delay difference later than the first synchronization signal transmitted through TX Ant. #0. According to some embodiments, the BS 200 may delay the signal to be transmitted through TX Ant. #0 by the propagation delay difference based on the received PDD information. For example, the BS 200 may perform control to delay a transmission time point of the first signal to be later than a time point of the second signal rather than simultaneously transmitting the first signal corresponding to TX Ant. #0 and the second signal corresponding to TX Ant. #1 through respective antennas. According to another embodiment, the BS 200 may transmit the signal to be transmitted through TX Ant. #1 to the MS 300 earlier by the propagation delay difference based on the received PDD information. For example, the BS 200 may control the transmission of the first signal to be earlier than the transmission of the second signal by the propagation delay difference rather than simultaneously transmitting the first signal corresponding to TX Ant. #0 and the second signal corresponding to TX Ant. #1 through respective antennas. According to another embodiment, the BS 200 may control the time point at which the signal to be transmitted through TX Ant. #0 is generated and the time point at which the signal to be transmitted through TX Ant. #0 is generated based on the PDD information. For example, the BS 200 may generate the first signal corresponding to TX Ant. #0 an amount of time equal to the propagation difference earlier than the second signal corresponding to TX Ant. #1, rather than generating the first signal and the second signal simultaneously.

Accordingly, the MS 300 may receive a MIMO signal from which inter-symbol interference between transmission antennas is cancelled in step 960. For example, as the BS 200 performs transmission after compensating for the propagation delay difference between signals transmitted through a plurality of antennas, the signals transmitted through the plurality of antennas may reach the MS 300 at the same time. Accordingly, the MS 300 may receive signal streams, in which inter-symbol interference is not generated, through a plurality of reception antennas.

Figure 10:
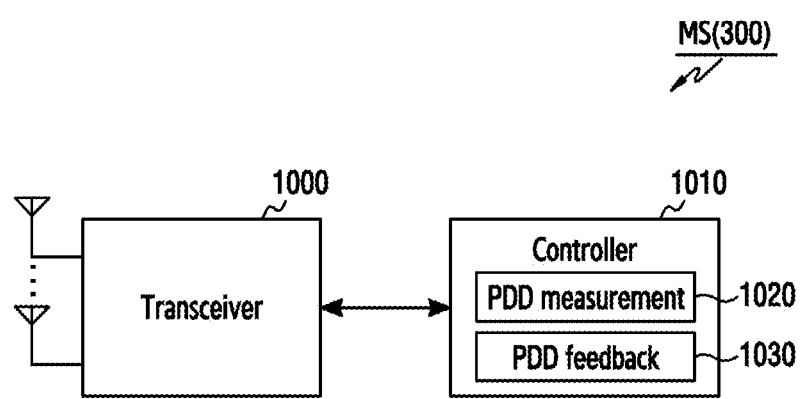
FIG. 10 is a block diagram illustrating the MS according to an embodiment of the present invention.

FIG. 10 is a block diagram illustrating the MS according to an embodiment of the present invention. FIG. 10 shows the configuration of the MS 300. The suffixes "~unit" or "~er" used hereinafter may refer to units for processing at least one function or operation, and may be implemented in hardware, software, or a combination of hardware and software.

Referring to FIG. 10, the MS 300 may include a plurality of antennas, a transceiver 1000, and a controller 1010. The plurality of antennas may transmit signals, which have been transmission-processed by the transceiver 1000, through radio channels and receive signals over the radio channels. The plurality of antennas may include an array antenna or antenna elements for supporting beamforming.

The transceiver 1000 transmission-processes signals to be transmitted, or reception-processes received signals. For example, the transceiver 1000 performs a function for conversion between a baseband signal and a bit sequence according to the system physical layer standard. In data transmission, the transceiver 1000 generates complex symbols by coding and modulating a transmission bit sequence. In data reception, the transceiver 1000 reconstructs a reception bit sequence by demodulating and decoding the baseband signal. At this time, the transceiver 1000 may divide the received signal in the unit of OFDM symbols and perform a Fast Fourier Transform (FFT) operation on the OFDM symbols so as to reconstruct complex symbols for each subcarrier. In addition, the wireless communication unit 1000 up-converts the baseband signal into a Radio-Frequency (RF) band signal, transmits the converted signal through a plurality of antennas, and then down-converts the RF band signal received through the plurality of antennas into the baseband signal. For example, the transceiver 1000 may include a transmission filter, a reception filter, an amplifier, a mixer, an oscillator, a Digital-to-Analog Converter (DAC), an Analog-to-Digital Converter (ADC), and the like.

Further, the transceiver 1000 may include a plurality of RF chains. In addition, the transceiver 1000 may perform beamforming. For beamforming, the transceiver 1000 may control the phase and size of each of the signals transmitted/received through a plurality of antennas or antenna elements. The transceiver 1000 transmits and receives signals as described above. The transceiver 1000 may be referred to as a communication unit or a transmission/reception unit, and may be separated into a transmission unit and a reception unit or into a transmitter and a receiver.

Further, the transceiver 1000 may perform cross-correlation on signals received through a plurality of antennas under the control of the controller 1010 according to an embodiment of the present invention.

The controller 1010 controls and processes the overall operation of the MS. For example, the controller 1010 performs control to transmit or receive signals through the transceiver 1000 and a plurality of antennas. To this end, the controller 1010 may include at least one processor. Particularly, according to an embodiment of the present invention, the controller 1010 may measure a propagation delay difference in a channel between a plurality of transmission antennas of the BS 200 and a plurality of reception antennas of the MS 300, and control and process a function of transmitting information on the measured propagation delay difference to the BS 200. To this end, the controller 1010 may include a PDD measurement module 1020 and a PDD feedback module 1030. The PDD measurement module 1020 may control the transceiver 1000 to perform cross-correlation on synchronization signals received through particular beams of a plurality of antennas and measure a propagation delay difference (PDD) between the received signals based on the cross correlation result.

The PDD feedback module 1030 controls and processes a function of feeding back the propagation delay difference measured by the PDD measurement module 1020 to the BS 200. For example, the PDD feedback module 1030 may add a PDD information field indicating the measured propagation delay difference to an uplink control signal, and may control and perform a function of transmitting the uplink control signal to the BS 200. The PDD information field according to an embodiment of the present invention may include a first information field indicating transmission antenna information of a signal that arrives first or last at the MS 300, and at least one second information field indicating a propagation delay difference between a signal of one transmission antenna indicated by the first information field and a signal of at least one other transmission antenna. According to another embodiment, the PDD information field may include at least one third information field indicating a propagation delay difference between a transmitted signal of a predetermined particular transmission antenna and a transmitted signal of at least one other transmission antenna.

Additionally, in order to reduce the number of bits added to the uplink control signal, the PDD feedback module 1030 may not directly transmit the propagation delay difference to the BS 200, but may add only the remaining higher bit region, excluding a lower bit region, which can be covered by the CP interval, in a bit sequence corresponding to the propagation delay difference to the PDD information field and transmit the PDD information field to the BS 200. At this time, the PDD feedback module 1030 may additionally transmit a PDD exponent field indicating a bit region signified by the PDD information field. Further, when the measured propagation delay difference can be covered by the CP interval or when the measured propagation delay difference satisfies Equation (2) and thus it is determined that inter-symbol interference is not generated in the interval in which the control signal and the data signal are actually received, the PDD feedback module 1030 may not transmit PDD information. At this time, the PDD feedback module 1030 may transmit the uplink control signal or add a 1-bit field indicating the presence or absence of PDD information to the uplink control signal. For example, when it is determined that transmission of the PDD information is not needed, the MS 300 may add a separate field indicating the absence of the PDD information to the uplink control signal so as to minimize the amount of information in the uplink control signal.

Additionally, the controller 1010 may select an optimal beam for each antenna at every synchronization time point and transmit information on the selected optimal beam for each antenna to the BS 200. For example, the controller 1010 may transmit an uplink signal including information on an optimal beam combination to the BS 200 along with the PDD information. At this time, when the number of bits required for indicating the measured propagation delay difference is larger than the number of bits of the predetermined PDD information field, the controller 1010 may determine that compensation for the measured propagation delay difference is impossible and exclude a beam combination corresponding to the corresponding propagation delay difference from a beam selection candidate group. When the optimal beam combination is selected at the synchronization time point, the controller 1010 may determine whether the propagation delay difference for the selected beam combination can be expressed by the PDD information field. When the propagation delay difference for the selected beam combination cannot be expressed by the PDD information field, the controller 1010 may select another beam combination and feed the selected beam combination back to the BS 200.

In addition, although not illustrated, the MS 300 may include a storage unit, and the storage unit may store data, such as a basic program, an application program, and setting information required for the operation of the MS.

Figure 11:
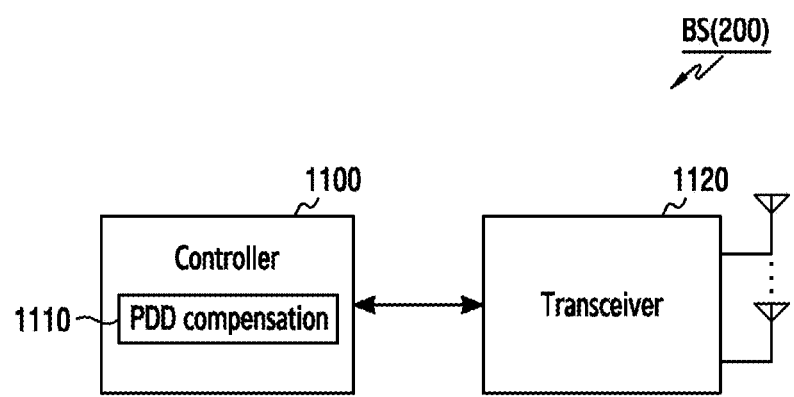
FIG. 11 is a block diagram illustrating the BS according to an embodiment of the present invention.

FIG. 11 is a block diagram illustrating the BS according to an embodiment of the present invention. FIG. 11 shows the configuration of the BS 200. The term "~unit" or "~er" used hereinafter may refer to the unit for processing at least one function or operation and may be implemented in hardware, software, or a combination of hardware and software.

Referring to FIG. 11, the BS 200 may include a controller 1100, a transceiver 1120, and a plurality of antennas. The controller 1100 controls and processes the overall operations of the BS. For example, the controller 1100 performs control to transmit or receive signals through the transceiver 1120 and a plurality of antennas. To this end, the control unit 1100 may include at least one processor. Particularly, according to an embodiment of the present invention, the controller 1100 may receive information on the propagation delay difference in the channel between a plurality of transmission antennas of the BS 200 and a plurality of reception antennas of the MS 300 from the MS 300. The controller 1100 may compensate for the propagation delay difference between signals to be transmitted through a plurality of transmission antennas by controlling the transceiver 1120 based on the information on the propagation delay difference. For example, the controller 1100 may include a PDD compensation module 1110. The PDD compensation module 1110 may acquire information on transmission antennas for the propagation delay difference and information on the propagation delay difference from an uplink control signal fed back from the MS 300. The PDD compensation module 1110 may control signals transmitted by a baseband signal processing module of the transceiver 1120 such that a signal to be transmitted through a particular transmission antenna is delayed by an amount of time equal to a propagation delay difference relative to a signal to be transmitted through another transmission antenna. The PDD compensation module 1110 may control signals transmitted by a baseband signal processing module such that a signal to be transmitted through a particular transmission antenna is transmitted earlier than a signal to be transmitted through another transmission antenna by a propagation delay difference. Further, the PDD compensation module 1110 may control and change the time point at which a signal to be transmitted through a particular antenna is generated by a module for processing a baseband signal based on a propagation delay difference.

The controller 1100 may control and process a function of transmitting synchronization signals that can be distinguished from each other through a plurality of antennas at every synchronization time point. The controller 1100 may identify an optimal beam for each antenna from an uplink control signal fed back from the MS 300, and control and process a function of transmitting a synchronization signal, a control signal, and/or a data signal through the identified optimal beam for each antenna.

The transceiver 1120 transmission-processes signals to be transmitted or reception-processes received signals. For example, the transceiver 1120 performs a function for conversion between a baseband signal and a bit sequence according to the system physical layer standard. In data transmission, the transceiver 1120 generates complex symbols by coding and modulating a transmission bit sequence. In data reception, the transceiver 1120 reconstructs a reception bit sequence by demodulating and decoding the baseband signal. At this time, the transceiver 1120 may divide the received signal in the unit of OFDM symbols and perform a Fast Fourier Transform (FFT) operation on the OFDM symbols so as to reconstruct complex symbols for each subcarrier. In addition, the wireless communication unit 1120 up-converts the baseband signal into a Radio-Frequency (RF) band signal, transmits the converted signal through an antenna, and then down-converts the RF band signal received through the antenna into the baseband signal. For example, the transceiver 1120 may include a transmission filter, a reception filter, an amplifier, a mixer, an oscillator, a Digital-to-Analog Converter (DAC), an Analog-to-Digital Converter (ADC), and the like.

Further, the transceiver 1120 may include a plurality of RF chains. In addition, the transceiver 1120 may perform beamforming. For beamforming, the transceiver 1120 may control the phase and size of each of the signals transmitted/received through a plurality of antennas or antenna elements. The transceiver 1120 transmits and receives signals as described above. The transceiver 1120 may be referred to as a communication unit or a transmission/reception unit, and may be separated into a transmission unit and a reception unit or into a transmitter and a receiver.

The transceiver 1120 may transmit synchronization signals that can be distinguished from each other at every synchronization time point through a plurality of antennas under the control of the controller 1100 according to an embodiment of the present invention. The transceiver 1120 may compensate for and transmit a propagation delay difference between control signals and data signals transmitted through a plurality of antennas under the control of the controller 1100. For example, the transceiver 1120 may control signals transmitted by a module for processing a baseband signal such that a signal to be transmitted through a particular antenna is delayed compared to a signal to be transmitted through another antenna or such that a signal to be transmitted through a particular antenna is transmitted earlier than a signal to be transmitted through another antenna. Further, the transceiver 1120 may control the time point at which the module for processing a baseband signal generates a signal to be transmitted through a particular signal. For example, the transceiver 1120 may change the timing of trigger signals for generating signals corresponding to a plurality of antennas.

The plurality of antennas may transmit signals, which have been transmission-processed by the transceiver 1120, through radio channels and receive signals over the radio channels. The plurality of antennas may include an array antenna or antenna elements for supporting beamforming.

In addition, although not illustrated, the BS 200 may include a storage unit, and the storage unit may store data, such as a basic program, an application, and setting information for the operation of the BS. The storage unit may also store information on a propagation delay difference and information on an optimal beam for each antenna received from each MS.

Figure 12:
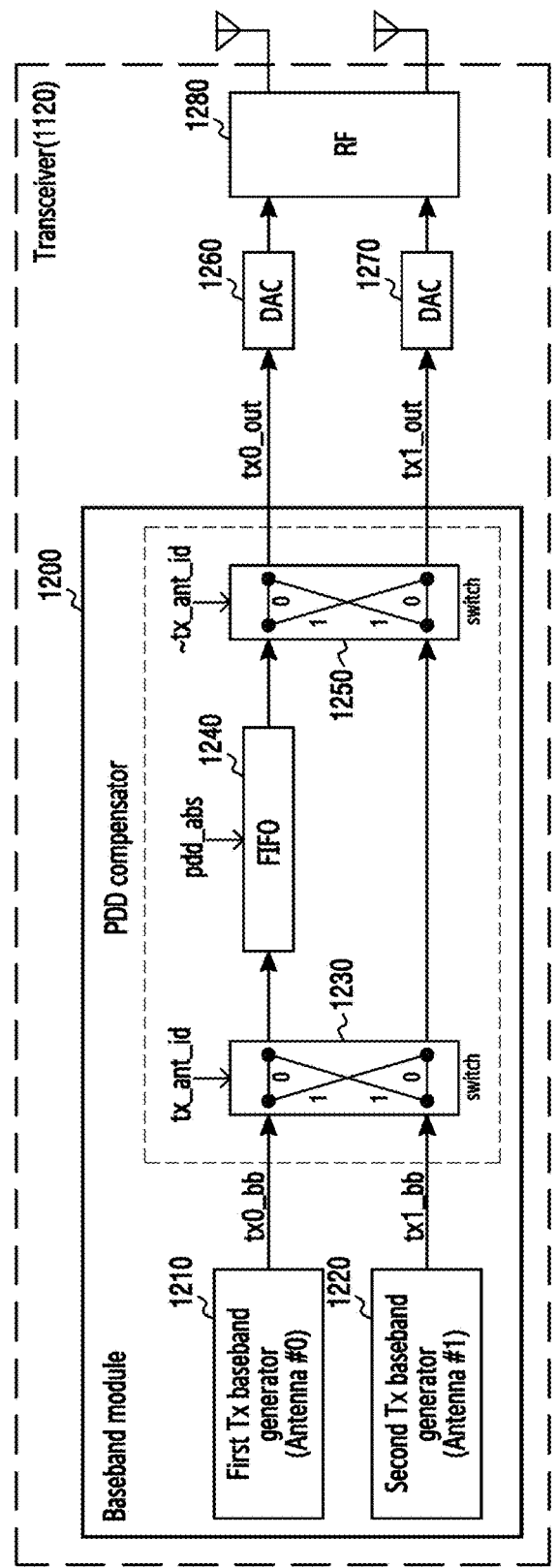
FIG. 12 illustrates an example of the detailed block configuration for a transceiver of the BS according to an embodiment of the present invention.

FIG. 12 illustrates an example of the detailed block configuration for the transceiver of the BS according to an embodiment of the present invention. FIG. 12 illustrates an example of the detailed block configuration when the transceiver 1120 of the BS 200 includes two transmission antenna chains. The suffixes "~unit" or "~er" used hereinafter may refer to a unit for processing at least one function or operation, and may be implemented in hardware, software, or a combination of hardware and software.

Referring to FIG. 12, the transceiver 1120 may include a baseband module 1200, DACs 1260 and 1270, and an RF module 1280. The baseband module 1200 may include a first TX baseband generator 1210, a second TX baseband generator 1220, a first switch 1230, a FIFO buffer 1240, and a second switch 1250. Here, the first switch 1230, the FIFO buffer 1240, and the second switch 1250 are referred to as a PDD compensator.

Each of the first TX baseband generator 1210 and the second TX baseband generator 1220 generates a transmission signal to be transmitted through each transmission antenna. For example, the first TX baseband generator 1210 generates a baseband signal to be transmitted through a first transmission antenna (TX Ant. #0) and the second TX baseband generator 1220 generates a baseband signal to be transmitted through a second transmission antenna (TX Ant. #1).

The first switch 1230 transmits a signal to be transmitted through a particular transmission antenna to the FIFO buffer 1240 based on transmission antenna information input from the controller 1100 (for example, transmission antenna identification information (tx_ant_id) or transmission antenna index information). For example, when the identification information of the first transmission antenna is input from the controller 1100, the first switch 1230 may transmit a signal provided from the first TX baseband generator 1210 to the FIFO buffer 1240 and may directly transmit a signal provided from the second TX baseband generator 1220 to the second switch 1250. In another example, when the identification information of the second transmission antenna is input from the controller 1100, the first switch 1230 may directly transmit a signal provided from the first TX baseband generator 1210 to the second switch 1250 and may transmit a signal provided from the second TX baseband generator 1220 to the FIFO buffer 1240.

The FIFO buffer 1240 may receive a propagation delay difference from the controller 1100, delay the signal input from the first switch 1230 by a time corresponding to the propagation delay difference, and then output the signal to the second switch 1250. Here, information on the propagation delay difference received from the controller 1100 may be an absolute value (pdd_abs) of the propagation delay difference measured by the MS 300.

The second switch 1250 may transmit a signal provided from the FIFO buffer 1240 to an antenna chain corresponding to a particular transmission antenna based on transmission antenna information input from the controller 1100 (for example, transmission antenna identification information (tx_ant_id) or transmission antenna index information). For example, when identification information of the first transmission antenna is input from the controller 1100, the second switch 1250 may output the signal provided from the FIFO buffer 1240 to an antenna chain (tx0_out) corresponding to the first transmission antenna and the signal directly provided from the first switch 1230 to an antenna chain (tx1_out) corresponding to the second transmission antenna. In another example, when identification information of the second transmission antenna is input from the controller 1100, the second switch 1250 may output the signal provided from the FIFO buffer 1240 to an antenna chain (tx1_out) corresponding to the second transmission antenna and the signal directly provided from the first switch 1230 to an antenna chain (tx0_out) corresponding to the first transmission antenna.

The DACs 1260 and 1270 convert an input baseband digital signal into an analog signal and transmit the analog signal to the RF module 1280. The RF module 1280 may convert the input baseband analog signal into a high-frequency signal and then transmit the high-frequency signal through a corresponding antenna.

Figure 13:
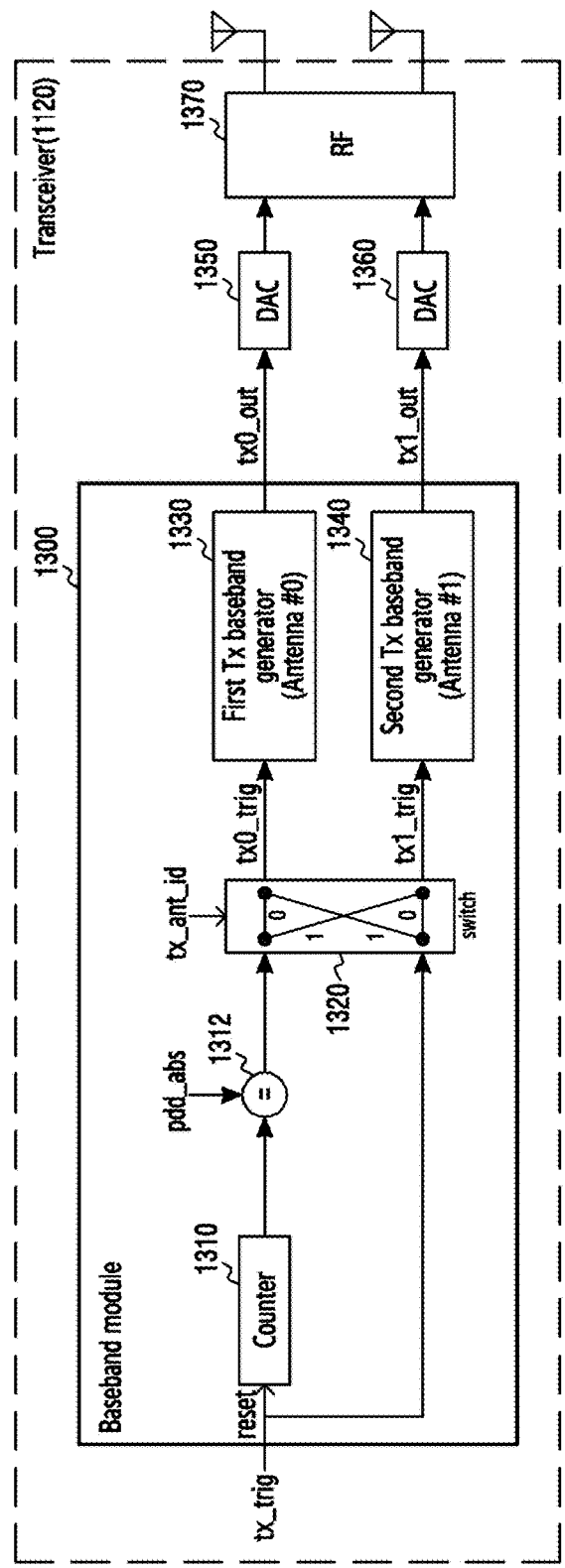
FIG. 13 illustrates another example of the detailed block configuration for the transceiver of the BS according to an embodiment of the present invention.

FIG. 13 illustrates another example of the detailed block configuration for the transceiver of the BS according to an embodiment of the present invention. FIG. 13 illustrates another example for the detailed block configuration when the transceiver 1120 of the BS 200 includes two transmission antenna chains. The suffixes "~unit" or "~er" used hereinafter may refer to a unit for processing at least one function or operation and may be implemented in hardware, software, or a combination of hardware and software.

Referring to FIG. 13, the transceiver 1120 may include a baseband module 1300, DACs 1350 and 1360, and an RF module 1370. The baseband module 1300 may include a counter 1310, a delayer 1312, a first switch 1320, a first TX baseband generator 1330, and a second TX baseband generator 1340.

The counter 1310 may receive a trigger signal (tx_trig) for starting the generation of a signal to be transmitted from the controller 1100. When the trigger signal is input, the counter 1310 is reset, measures a time, and outputs the measured time value to the delayer 1312.

The delayer 1312 may receive information on a propagation delay difference from the controller 1100, and when the time input from the counter 1310 is the same as a time corresponding to the propagation delay difference, output the trigger signal from the counter 1310 to the first switch 1320. Here, information on the propagation delay difference received from the controller 1100 may be an absolute value (pdd_abs) of the propagation delay difference measured by the MS 300.

The first switch 1320 may control the transmission of the trigger signal based on transmission antenna information input from the controller 1100 (for example, transmission antenna identification information (tx_ant_id) or transmission antenna index information). For example, when identification information of the first transmission antenna is input from the controller 1100, the first switch 1320 may output the trigger signal provided from the delayer 1312 to the first TX baseband generator 1330 and output the trigger signal, which has not passed through the delayer 1312, to the second TX baseband generator 1340 in order to transmit the signal to be transmitted through the first transmission antenna later than the signal to be transmitted through the second transmission antenna by the propagation delay difference. In another example, when identification information of the second transmission antenna is input from the controller 1100, the first switch 1320 may output the trigger signal provided from the delayer 1312 to the second TX baseband generator 1340 and output the trigger signal, which has not passed through the delayer 1312, to the first TX baseband generator 1330 in order to transmit the signal to be transmitted through the second transmission antenna later than the signal to be transmitted through the first transmission antenna by the propagation delay difference. For example, the first switch 1320 may perform control such that the trigger signal indicating the start of generation of the transmitted signal is transmitted to the first TX baseband generator 1330 and the second TX baseband generator 1340 at different time points.

When the trigger signal is input, the first TX baseband generator 1330 and the second TX baseband generator 1340 generate signals to be transmitted through corresponding transmission antennas and output the generated signals to corresponding transmission antenna chain ends. For example, when the trigger signal is input, the first TX baseband generator 1330 may generate a baseband signal to be transmitted through the first transmission antenna (TX Ant. #0) and output the generated signal to the first transmission antenna chain end (tx0_out). In another example, when the trigger signal is input, the second TX baseband generator 1340 may generate a baseband signal to be transmitted through the second transmission antenna (TX Ant. #1) and output the generated signal to the second transmission antenna chain end (tx1_out).

The DACs 1350 and 1360 convert an input baseband digital signal into an analog signal and transmit the analog signal to the RF module 1370. The RF module 1370 may convert the input baseband analog signal into a high-frequency signal and then transmit the high-frequency signal through a corresponding antenna.

Figure 14:
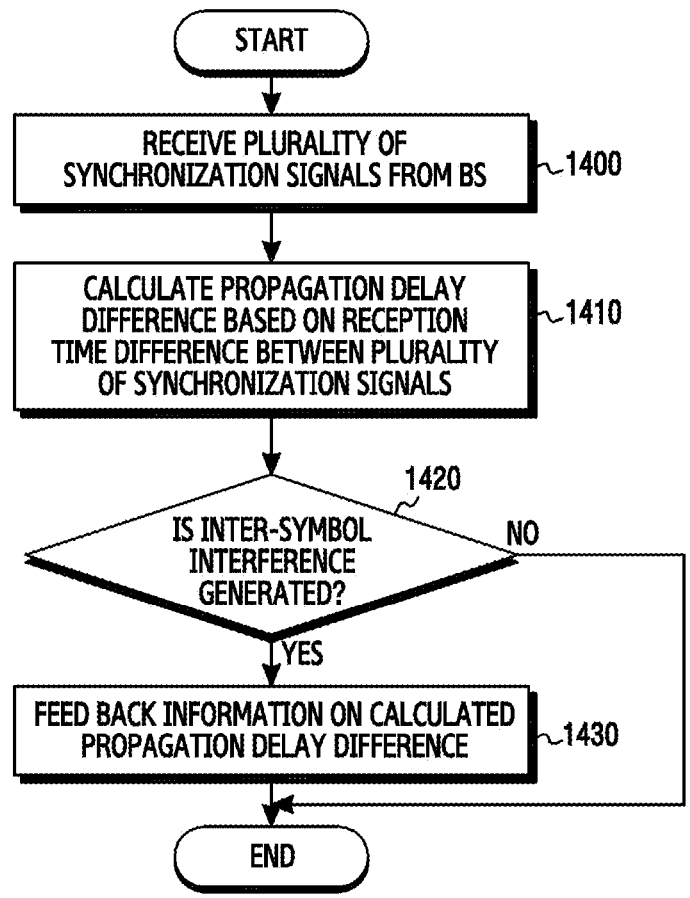
FIG. 14 illustrates an operation procedure of the MS according to an embodiment of the present invention.

FIG. 14 illustrates an operation procedure of the MS according to an embodiment of the present invention.

Referring to FIG. 14, the MS 300 receives a plurality of synchronization signals from the BS in step 1400. For example, the MS 300 may receive synchronization signals through particular beams of the plurality of antennas from the BS at every synchronization time point.

The MS 300 measures a propagation delay difference between channels based on a reception time difference between the plurality of synchronization signals in step 1410. For example, the MS 300 may perform cross-correlation on the signals received through the plurality of antennas and measure a propagation delay difference (PDD) based on the cross-correlation result. For example, the MS 300 may perform cross-correlation between a signal received through RX Ant. #0 and a signal received through RX Ant. #1 and measure a difference (|τ0−τ1|) between a propagation delay τ0 100 for a channel between TX Ant. #0 and RX Ant. #0 and a propagation delay τ1 110 for a channel between TX Ant. #1 and RX Ant. #1.

The MS 300 determines whether inter-symbol interference is generated in step 1420. For example, the MS 300 may determine whether inter-symbol interference is generated in an interval corresponding to the current time point at which a control signal and a data signal are received based on channel information of a synchronization signal received at a previous time point and channel information of a synchronization signal received at the current time point. For example, the MS 300 may determine whether inter-symbol interference is generated based on Equation (2) above. When the channel information for the synchronization signal received at the previous time point and the channel information for the synchronization signal received at the current time point satisfy Equation (2), the MS 300 may determine that inter-symbol interference will not be generated in the interval corresponding to the current time point in which the control signal and the data signal are received. On the other hand, when the channel information for the synchronization signal received at the previous time point and the channel information for the synchronization signal received at the current time point do not satisfy Equation (2), the MS 300 may determine that inter-symbol interference will be generated in the interval corresponding to the current time point, in which the control signal and the data signal are received.

When it is determined that inter-symbol interference will not be generated, the MS 300 ends the procedure according to an embodiment of the present invention without transmitting the propagation delay difference to the BS 200. For example, since the synchronization time point between the BS 200 and the MS 300 is fixed, the BS 200 does not compensate for the propagation delay difference for the synchronization signal, and compensates for the propagation delay difference only for the control signal and the data signal. Accordingly, although the propagation delay difference measured by the MS 300 at a second synchronization time point (t+Δt) cannot be covered by the CP interval, inter-symbol interference may not actually be generated in the interval in which the control signal and the data signal are received. Therefore, when it is determined that inter-symbol interference is not generated based on Equation (2), the MS 300 may determine that information on the propagation delay difference at the previous time point reported to the BS 200 and the propagation delay difference has been compensated for, and does not report information on the propagation delay difference at the current time point to the BS 200. At this time, the MS 300 may not transmit an uplink control signal. Further, the MS 300 may add a 1-bit field indicating the presence or absence of PDD information to the uplink control signal including optimal antenna beam combination information for the channel between the MS 300 and the BS 200. For example, when it is determined that transmission of the PDD information is not needed, the MS 300 may add a separate field indicating the absence of the PDD information to the uplink control signal so as to minimize the amount of information in the uplink control signal.

On the other hand, when it is determined that inter-symbol interference will be generated, the MS 300 may feed the information on the propagation delay difference back to the BS 200 in step 1430. For example, the MS 300 may add PDD information indicating the propagation delay difference for at least one antenna to the uplink control signal including optimal antenna beam combination information for the channel between the MS 300 and the BS 200 and transmit the uplink control signal to the BS 200. The PDD information field according to an embodiment of the present invention may include a first information field indicating transmission antenna information (for example, an index) of a signal, which arrives at the MS 300 first or last, and at least one second information field indicating a propagation delay difference between a signal of a transmission antenna of the first information field and a signal of at least one other transmission antenna. The PDD information field according to another embodiment of the present invention may include at least one third information field indicating a propagation delay difference between a transmitted signal of a particular transmission antenna, which is pre-arranged with the BS 200, and a transmitted signal of at least one other transmission antenna. According to another embodiment of the present invention, in order to reduce the number of bits added to the uplink control signal, the MS 300 may not directly transmit the propagation delay difference to the BS 200, but may add the remaining intervals except for the interval that can be covered by the CP interval in the propagation delay difference to the PDD information field and transmit the PDD information field to the BS 200. At this time, the MS 300 may additionally transmit a PDD index field indicating the bit region signified by the PDD information field.

Thereafter, the MS 300 ends the procedure according to an embodiment of the present invention.

Figure 15:
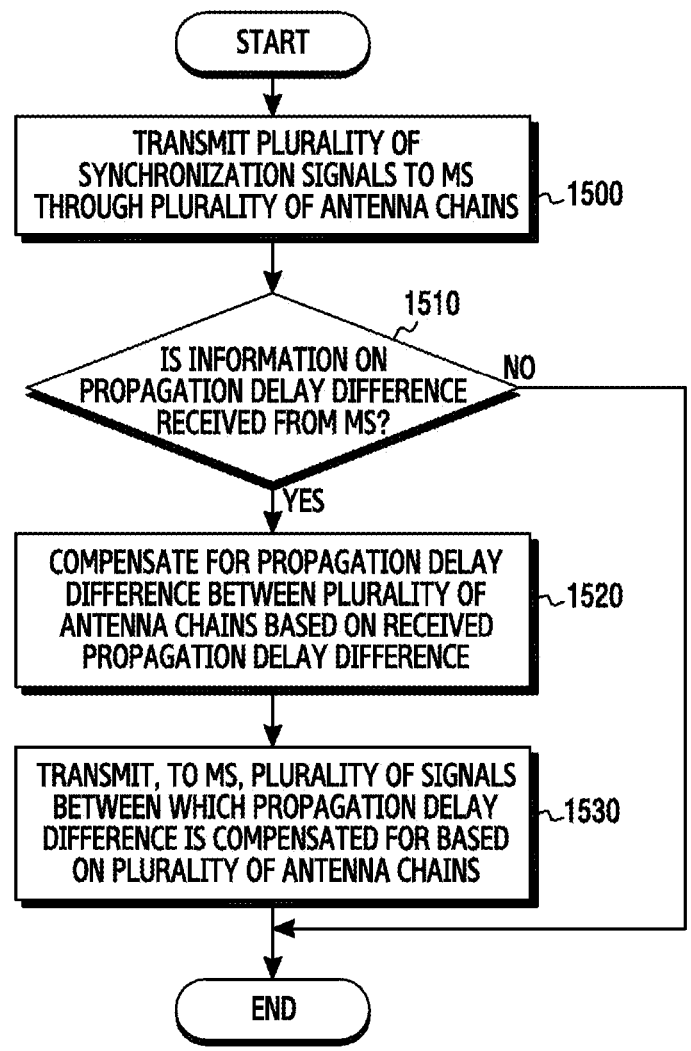
FIG. 15 illustrates an operation procedure of the BS according to an embodiment of the present invention.

FIG. 15 illustrates an operation procedure of the BS according to an embodiment of the present invention.

Referring to FIG. 15, the BS 200 transmits a plurality of synchronization signals to the MS 300 through a plurality of antenna chains in step 1500. For example, the BS 200 may generate different synchronization signals corresponding to a plurality of transmission antennas at a preset synchronization time point and transmit the different synchronization signals through optimal beams of the plurality of antennas to the MS 300 at the same time.

The BS 200 determines whether information on a propagation delay difference is received from the MS 300 in step 1510. After, transmitting the synchronization signal, the BS 200 may determine whether an uplink control signal including information on the propagation delay difference is received from the MS 300. When an uplink control signal including information on the propagation delay difference is not received from the MS 300, the BS 200 determines that inter-symbol interference between the plurality of antennas is not generated in the MS 300 and ends the procedure according to an embodiment of the present invention.

On the other hand, when an uplink control signal including information on the propagation delay difference is received from the MS 300, the BS 200 compensates for the propagation delay difference between a plurality of antenna chains based on the received propagation delay difference in step 1520. For example, the BS 200 may acquire particular antenna information for the propagation delay difference from the uplink control signal fed back from the MS 300 and perform control such that a signal to be transmitted through the particular transmission antenna is delayed by the propagation delay difference relative to a signal to be transmitted through another transmission antenna. In another example, the BS 200 may perform control such that a signal to be transmitted through the particular transmission antenna is transmitted an amount of time equal to the propagation delay difference earlier than a signal to be transmitted through another transmission antenna. Further, the BS 200 may control the time point at which the signal to be transmitted through the particular transmission antenna is generated by a module for processing a baseband signal based on the propagation delay difference.

Thereafter, the BS 200 transmits the plurality of signals between which the propagation delay difference has been compensated for to the MS 300 through the plurality of antenna chains in step 1530. Then, the BS 200 ends the procedure according to an embodiment of the present invention.

Figure 16:
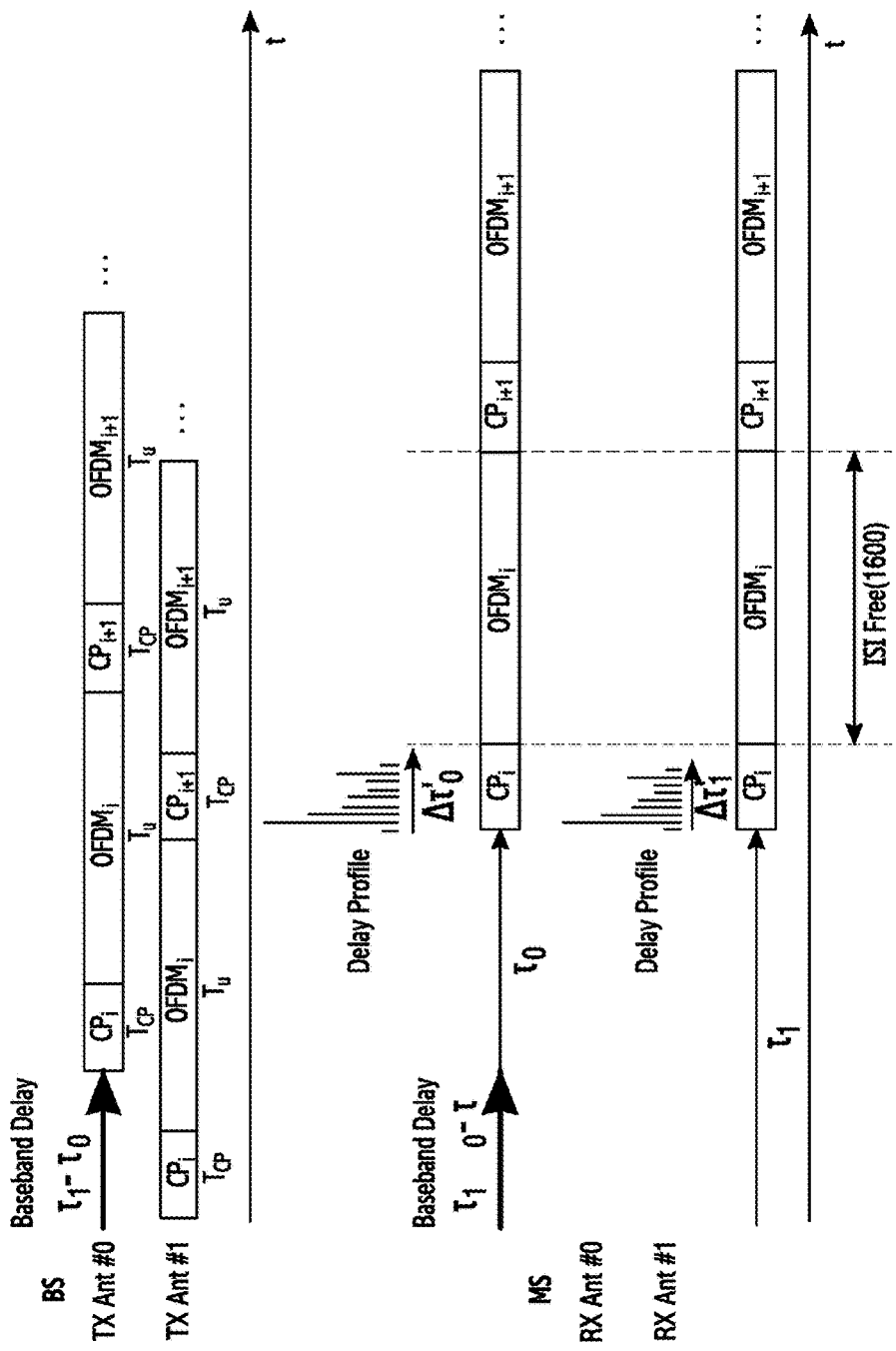
FIG. 16 illustrates a compensation result of a propagation delay difference in a beamforming MIMO system according to an embodiment of the present invention.

FIG. 16 illustrates a compensation result of a propagation delay difference in a beamforming MIMO system according to an embodiment of the present invention.

Referring to FIG. 16, as described above, the BS 200 may compensate for a propagation delay difference for a plurality of transmission antennas and transmit a signal to the MS 300, so that the arrival times of two streams received by the MS 300 through a plurality of reception antennas may match each other. That is, inter-symbol interference is generated in an OFDM symbol interval in the conventional communication system, as illustrated in FIG. 2, but it is noted that there is no inter-symbol interference in an OFDM symbol interference in a communication system according to an embodiment of the present invention, as indicated by reference numeral 1600. Accordingly, in the beamforming MIMO system according to an embodiment of the present invention, when delay spread of a signal stream is covered by the CP interval which is the same as that in the SISO mode, the signal may be demodulated without performance deterioration.

Figure 17:
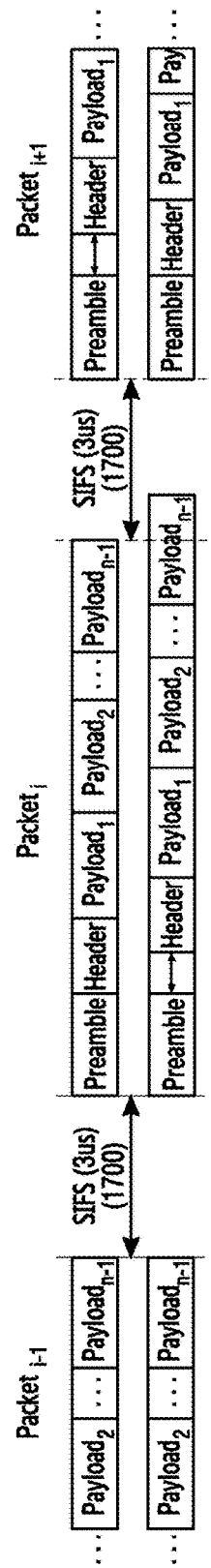
FIG. 17 illustrates a protection interval for compensating for a propagation delay difference according to an embodiment of the present invention.

As described above, when the BS 200 transmits at least one signal with a delay or transmits at least one signal earlier in order to compensate for the propagation delay difference between a plurality of antennas, a guide time is required. The guide time is required when the BS 200 switches a transmission beam of an antenna, but is not required when a symbol is successively transmitted through a fixed beam. Accordingly, when the transmission is performed through the fixed beam, throughput loss may not be generated. For example, in the case of a frame communication scheme (for example, next-generation mobile 5G), the guide time for switching the transmission beam should be added at the time point at which Time-Division Multiplexing (TDM) transmission is possible for each UE. In another example, in the case of a packet communication scheme (for example, WiGig), as illustrated in FIG. 17, the embodiment of the present invention can be applied based on a Short Inter-Frame Space (SIFS) interval of 3 us, defined as a guide time between packets, without any throughput loss without modification of the standard. When the guide time is used, since a channel environment of a backhaul having no mobility is fixed, no further throughput loss occurs after making initial settings.

As described above, in the embodiment of the present invention, the MS may feed back information on the propagation delay difference and minimize the amount of information contained in an uplink control signal required for the feedback.

Further, the embodiment of the present invention described above may be used for improving frequency efficiency in a Spatial Multiplexing (SM) MIMO mode, and may also be used in a transmission-diversity (for example, STBC or SFBC) mode and a reception-diversity (for example, MRC) mode in order to secure an additional signal-to-noise ratio.

Although the present invention has been described by the restricted embodiments and the drawings as described above, the present invention is not limited to the aforementioned embodiments and various modifications and alterations can be made from the descriptions by those skilled in the art to which the present invention pertains.

Particular aspects of the present invention may be implemented as a computer-readable code in a computer-readable recording medium. The computer-readable recording medium is a predetermined data storage device which can store data which can be read by a computer system. Examples of the computer readable recording medium may include a Read-Only Memory (ROM), a Random Access Memory (RAM), a CD-ROM, a magnetic tape, a floppy disk, an optical data storage device, and a carrier wave (such as data transmission through the Internet). The computer-readable recording medium may be distributed through computer systems connected to the network, and accordingly the computer-readable code is stored and executed in a distributed manner. Further, functional programs, codes and code segments for achieving the present invention may be easily interpreted by programmers skilled in the art which the present invention pertains to.

It will be understood that a method and apparatus according to an embodiment of the present invention may be implemented in the form of hardware, software, or a combination of hardware and software. Any such software may be stored, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of its ability to be erased or its ability to be re-recorded. It can be also appreciated that the memory included in the mobile terminal is one example of machine-readable devices suitable for storing a program including instructions that are executed by a processor device to thereby implement embodiments of the present invention.

Accordingly, the present invention includes a program for a code implementing the apparatus and method described in the appended claims of the specification and a machine (a computer or the like)-readable storage medium for storing the program. Further, the program may be electronically transferred by a predetermined medium such as a communication signal transferred through a wired or wireless connection, and the present invention appropriately includes equivalents of the program.

Further, an apparatus according to an embodiment of the present invention may receive the program from a program providing device that is wiredly or wirelessly connected thereto, and may store the program. The program providing device may include a program including instructions through which a program processing device performs a preset content protecting method, a memory for storing information and the like required for the content protecting method, a communication unit for performing wired or wireless communication with the program processing device, and a controller for transmitting the corresponding program to a transceiver at the request of the program processing device or automatically.

Although the embodiment has been described in the detailed description of the present invention, the present invention may be modified in various forms without departing from the scope of the present invention. Therefore, the scope of the present invention should not be defined as being limited to the embodiments, but should be defined by the appended claims and equivalents thereof.

What is claimed:

1. An apparatus of a base station (BS) in a wireless communication system, the apparatus comprising:
    at least one transceiver; and
    at least one processor operably coupled to the at least one transceiver,
    wherein the at least one processor is configured to:
        transmit, to a terminal, a first synchronization signal using a first transmission antenna of the BS and a second synchronization signal using a second transmission antenna of the BS;
        receive, from the terminal, information related to a propagation delay difference (PDD) between the first synchronization signal and the second synchronization signal; and
        transmit, to the terminal, a first stream signal using the first transmission antenna and a second stream signal using the second transmission antenna by adjusting a transmission timing of at least one of the first stream signal or the second stream signal based on the information related to the PDD,
    wherein the information related to the PDD is transmitted if a time interval corresponding to the PDD and a delay spread is longer than a length of cyclic prefix (CP).

2. The apparatus of claim 1, wherein the information related to the PDD includes identification information of the first transmission antenna and information indicating a PDD between the first transmission antenna and at least one other antenna, and
    wherein the first transmission antenna is an antenna of the BS corresponding to a synchronization signal that arrives at a mobile station (MS) first or last among a plurality of transmission antennas of the BS.

3. The apparatus of claim 1, wherein the at least one processor is, in order to transmit the first stream signal and the second stream signal, configured to:
    determine a first transmission time point for the first stream signal and a second transmission time point for the second stream signal by delaying the at least one of the first stream signal or the second stream signal by a time corresponding to the PDD; and
    transmit the first stream signal at the first transmission time point and the second stream signal at the second transmission time point.

4. The apparatus of claim 3, wherein the first transmission time point and the second transmission time point are associated with one orthogonal frequency division multiplexing (OFDM) symbol for a mobile station (MS) to receive the first stream signal and the second stream signal.

5. The apparatus of claim 1, wherein the transmission timing is adjusted in a baseband such that a time difference between a first arrival time of the first stream signal at a mobile station (MS) and a second first arrival time of the second stream signal at the MS is within the length of the CP.

6. An apparatus of a terminal in a wireless communication system, the apparatus comprising:
    at least one transceiver; and
    at least one processor operably coupled to the at least one transceiver,
    wherein the at least one processor is configured to:
        receive, from a base station (BS), a first synchronization signal transmitted by using a first transmission antenna of the BS and a second synchronization signal transmitted by using a second transmission antenna of the BS;
        transmit, to the BS, information related to a propagation delay difference (PDD) between the first synchronization signal and the second synchronization signal if a time interval corresponding to the PDD and a delay spread is longer than a length of cyclic prefix (CP); and
        receive, from the BS, a first stream signal transmitted by using the first transmission antenna and a second stream signal transmitted by using using the second transmission antenna, and
    wherein a transmission timing for at least one of the first stream signal or the second stream signal is adjusted based on the information related to the PDD.

7. The apparatus of claim 6, wherein the information related to the PDD includes identification information of the first transmission antenna and information indicating a PDD between the first transmission antenna and at least one other antenna, and
    wherein the first transmission antenna is an antenna of the BS corresponding to a synchronization signal that arrives at a mobile station (MS) first or last among a plurality of transmission antennas of the BS.

8. The apparatus of claim 6, wherein the information related the PDD includes upper bits among a plurality of bits of a bit sequence indicating the PDD, and
    wherein lowers bit except the upper bits from the plurality of bits to the delay spread corresponding to the CP.

9. The apparatus of claim 6, wherein the at least one processor is, in order to transmit the information related to the PDD, configured to:
- identify that inter-symbol interference (ISI) occurs if the time interval corresponding to the PDD and the delay spread is longer than a length of the CP; and
- in response to identifying that the inter-symbol interference occurs, transmit the information related the PDD to the BS.

10. The apparatus of claim 6, wherein the at least one processor is further configured to:
- when the PDD is larger than or equal to a maximum PDD, determine candidate beams by excluding a beam corresponding to the PDD among a plurality of beams of the BS; and
- transmit, to the BS, information for indicating a beam identified to perform communication between the BS and the terminal among the determined candidate beams.

11. The apparatus of claim 6, wherein the transmission timing is adjusted in a baseband such that a time difference between a first arrival time of the first stream signal at a mobile station (MS) and a second first arrival time of the second stream signal at the MS is within a length of the CP.

12. The apparatus of claim 6, wherein the first stream signal and the second stream signal are received within one orthogonal frequency division multiplexing (OFDM) symbol for a mobile station (MS) including the CP.

13. A method for operating a terminal in a wireless communication system, the method comprising:
- receiving, from a base station (BS), a first synchronization signal transmitted by using a first transmission antenna of the BS and a second synchronization signal transmitted by using a second transmission antenna of the BS;
- transmitting, to the BS, information related to a propagation delay difference (PDD) between the first synchronization signal and the second synchronization signal if a time interval corresponding to the PDD and a delay spread is longer than a length of cyclic prefix (CP); and
- receiving, from the BS, a first stream signal transmitted by using the first transmission antenna and a second stream signal transmitted by using using the second transmission antenna,
- wherein a transmission timing for at least one of the first stream signal or the second stream signal is adjusted based on the information related to the PDD.

14. The method of claim 13, wherein the information related to the PDD includes identification information of the first transmission antenna and information indicating a PDD between the first transmission antenna and at least one other antenna, and
- wherein the first transmission antenna is an antenna of the BS corresponding to a synchronization signal that arrives at a mobile station (MS) first or last among a plurality of transmission antennas of the BS.

15. The method of claim 13, wherein the information related the PDD includes upper bits among a plurality of bits of a bit sequence indicating the PDD, and
- wherein lowers bit except the upper bits from the plurality of bits to the delay spread corresponding to the CP.

16. The method of claim 13, wherein transmitting the information related to the PDD comprises:
- identifying that inter-symbol interference (ISI) occurs if the time interval corresponding to the PDD and the delay spread is longer than a length of the CP; and
- in response to identifying that the inter-symbol interference occurs, transmitting the information related the PDD to the BS.

17. The method of claim 13, further comprising:
- when the PDD is larger than or equal to a maximum PDD, determining candidate beams by excluding a beam corresponding to the PDD among a plurality of beams of the BS; and
- transmitting, to the BS, information for indicating a beam identified to perform communication between the BS and the terminal among the determined candidate beams.

18. The method of claim 13, wherein the transmission timing is adjusted in a baseband such that a time difference between a first arrival time of the first stream signal at a mobile station (MS) and a second first arrival time of the second stream signal at the MS is within a length of the CP.

19. The method of claim 13, wherein the first stream signal and the second stream signal are received within one orthogonal frequency division multiplexing (OFDM) symbol for a mobile station (MS) including the CP.

* * * * *